United States Patent
Goyal et al.

(10) Patent No.: US 10,073,822 B2
(45) Date of Patent: Sep. 11, 2018

(54) METHOD AND APPARATUS FOR GENERATING PREDICTIVE INSIGHTS FOR AUTHORING SHORT MESSAGES

(71) Applicants: Adobe Systems Incorporated, San Jose, CA (US); Neolane SAS, Arcueil (FR)

(72) Inventors: Tanya Goyal, Mumbai (IN); Kokil Jaidka, Bangalore (IN); Frederic Mary, Maisons-Alfort (FR)

(73) Assignees: ADOBE SYSTEMS INCORPORATED, San Jose, CA (US); NEOLANE SAS, Arcueil (FR)

( * ) Notice: Subject to any disclaimer, the term of this patent is extended or adjusted under 35 U.S.C. 154(b) by 35 days.

(21) Appl. No.: 15/146,676

(22) Filed: May 4, 2016

(65) Prior Publication Data
US 2017/0322917 A1 Nov. 9, 2017

(51) Int. Cl.
*G06F 17/00* (2006.01)
*G06F 17/24* (2006.01)
*G06F 17/27* (2006.01)
*G06Q 30/02* (2012.01)

(52) U.S. Cl.
CPC .......... *G06F 17/24* (2013.01); *G06F 17/276* (2013.01); *G06Q 30/0242* (2013.01); *G06Q 30/0251* (2013.01)

(58) Field of Classification Search
None
See application file for complete search history.

(56) References Cited

U.S. PATENT DOCUMENTS

| | | | | |
|---|---|---|---|---|
| 8,370,280 B1* | 2/2013 | Lin | ...................... | G06N 99/005 706/12 |
| 8,868,472 B1* | 10/2014 | Lin | ...................... | G06N 99/005 706/12 |
| 2003/0233419 A1* | 12/2003 | Beringer | .............. | G06Q 10/107 709/206 |
| 2009/0171879 A1* | 7/2009 | Bullen | ................... | G06N 7/005 706/47 |

(Continued)

OTHER PUBLICATIONS

Adestra 2013 Subject Line Analysis Report (2013). Retrieved from http://www.adestra.com/resources/downloadable-reports/2013-subject-line-analysis-report/?utm_source=econsultancy&utm_medium=blog&utm_campaign=Adestra_Subject_Line_Report_2013.

(Continued)

*Primary Examiner* — Howard Cortes
(74) *Attorney, Agent, or Firm* — Keller Jolley Preece

(57) ABSTRACT

A method for generating predictive insights for authoring messages is provided. The method includes receiving a message to be sent as an input. Key performance indicator (KPI) whose value is to be predicted for the message is identified from the input or marketing tool configuration. A plurality of feature vectors of the message are generated. KPI contributions for the plurality of feature vectors are determined using feature vectors of messages sent in past and tracked KPI values of the messages sent in past. The KPI contribution is a measure of contribution of feature vector to value of the KPI. Value of the KPI for the message is predicted by applying determined KPI contributions to the plurality of feature vectors. Apparatus for substantially performing the method as described herein is also provided.

20 Claims, 20 Drawing Sheets

(56) References Cited

U.S. PATENT DOCUMENTS

| | | |
|---|---|---|
| 2016/0275401 A1* | 9/2016 | Cao .................... G06N 5/04 |
| 2017/0068906 A1* | 3/2017 | Korycki ............. G06N 99/005 |
| 2017/0228680 A1* | 8/2017 | Atedgi ............ G06Q 10/06393 |
| 2017/0262866 A1* | 9/2017 | Barker ................. G06Q 30/02 |

OTHER PUBLICATIONS

Burke, M. (2006). Predicting Reply for Newsgroup Messages: A Two-Stage Model with Subject Line Features.

Chittenden, L., & Rettie, R. (2003). An evaluation of e-mail marketing and factors affecting response. Journal of Targeting, Measurement and Analysis for Marketing, 11(3), 203-217.

Paquet, M., Improve Your Open Rates With These 12 Subject Line Tweaks, ConstantContact (2015). Retrieved from http://blogs.constantcontact.com/good-email-subject-lines/ on Nov 5, 2015.

Christopher Ratcliff, 45 words to avoid in your email marketing subject lines, Econsultancy (2015). Retrieved from https://econsultancy.com/blog/64878-45-words-to-avoid-in-your-email-marketing-subject-lines/ on Nov 5, 2015.

HubSpot (2015). Retrieved from http://www.getsidekick.com/blog/subject-line-stats-open-rates-slideshare?utm_source=email&utm_campaign=subject_lines_ss&utm_content=blog_emails&_hsenc=p2ANcitz--iZ3tehtb6ItascwbRiXn_8vnGZVGUWf5CP7st3hBdvDMR4re915Ehdf7YR0TBKfG_0fQ2xuj3aJshuXkVUYkcwSdnCA&_hsmi=17428505 on Nov 5, 2015.

Janke, R. (2014). Effects of Mentioning the Incentive Prize in the Email Subject Line on Survey Response.Evidence Based Library and Information Practice, 9(1), 4-13.

Kerr, B. (Oct. 2003). Thread arcs: An email thread visualization. In Information Visualization, 2003. INFOVIS 2003. IEEE Symposium on (pp. 211-218). IEEE.

Karagiannis, T., & Vojnovic, M. (Apr. 2009). Behavioral profiles for advanced email features. In Proceedings of the 18th international conference on World wide web (pp. 711-720). ACM.

Kruse, Y., Callegaro, M., Thomas, M., & Nukulkij, P. (2009). The Effect of Email Invitation Customization on Survey Completion Rates in an Internet Panel: A Meta-analysis of 10 Public Affairs Surveys. InProceeding of the AAPOR-JSM conferences (pp. 5764-5778).

Knowledge Base, MailChimp (2015). Retrieved from http://kb.mailchimp.com/campaigns/previews-and-tests/best-practices-for-email-subject-lines on Nov 5, 2015.

Navaroli, N., & Smyth, P. (Apr. 2015). Modeling Response Time in Digital Human Communication. In Ninth International AAAI Conference on Web and Social Media.

Viégas, F. B., Golder, S., & Donath, J. (Apr. 2006). Visualizing email content: portraying relationships from conversational histories. In Proceedings of the SIGCHI conference on Human Factors in computing systems (pp. 979-988). ACM.

Bawm, Z. L., & Nath, R. P. D. (Dec. 2014). A Conceptual Model for effective email marketing. In Computer and Information Technology (ICCIT), 2014 17th International Conference on (pp. 250-256). IEEE.

Kiritchenko, S., & Matwin, S. (Nov. 2011). Email classification with co-training. In Proceedings of the 2011 Conference of the Center for Advanced Studies on Collaborative Research (pp. 301-312). IBM Corp.

Liu, B., Feng, J., Liu, M., Hu, H., & Wang, X. (2015). Predicting the quality of user-generated answers using co-training in community-based question answering portals. Pattern Recognition Letters, 58, 29-34.

Luo, X., Nadanasabapathy, R., Zincir-Heywood, A. N., Gallant, K., & Peduruge, J. (2015). Predictive Analysis on Tracking Emails for Targeted Marketing. In Discovery Science (pp. 116-130). Springer International Publishing.

Marinova, A. M. J., and Massey, BL (2002) Permission email marketing as a means of targeted promotion. Cornell Hotel and Restaurant Administrative Quarterly, 41(1), 58-67.

May, P., Ehrlich, H.C., Steinke, T. (2002). Email marketing: success factors. Retrieved from http://eprints.kingston.ac.uk/2108/1/paper.html.

Porter, S. R., & Whitcomb, M. E. (2005). E-mail subject lines and their effect on web survey viewing and response. Social Science Computer Review, 23(3), 380-387.

Sappleton, N., & Lourenço, F. (2015). Email subject lines and response rates to invitations to participate in a web survey and a face-to-face interview: the sound of silence. International Journal of Social Research Methodology, 1-12.

Vriens, M., Van der Scheer, H. R., Hoekstra, J. C., & Roelf Bult, J. (1998). Conjoint experiments for direct mail response optimization. European journal of Marketing, 32(3/4), 323-339.

Zhang, W., Ahmed, A., Yang, J., Josifovski, V., & Smola, A. J. (Aug. 2015). Annotating Needles in the Haystack without Looking: Product Information Extraction from Emails. In Proceedings of the 21th ACM SIGKDD International Conference on Knowledge Discovery and Data Mining (pp. 2257-2266). ACM.

* cited by examiner

| Social | Negemo | Inclusive words | Time of sending |
|---|---|---|---|
| Posemo | Tentative | % | No. of people targeted |
| Auxiliary verb | Insight | $ | Sendername |
| Festive/day | Number | ! | Dayofweek |
| , | - | ; | Pcdiscount |
| Words | Use | Only | Pcdollar |
| Bigrams | Dollardiscount | Length | . |
| No. of categories | No. of characters | Your | ? |
| No. of information types | Buyonegetone | Superlatives | N-grams |
| Comeback | Saleoffer | Cartabandoned | Wordsincaps |
| Newjoinee | Followuptopurchase | Festivalseason | Benefit |
| Freeshipping | Lastchance | Membership deal | Newarrivals |
| Urgency | Questions | Productmention | Discovery |
| Testimonial | Howto | Reasons | Attention targeted |
| Attention targeted | Name-mentions | News | Name-mentions |
| Dollaroff15andunder | Dollaroff16to25 | Dollaroff25to40 | News |
| Dollaroff56to70 | Dollaroff71andabove | Pcoff15anduder | Pcoff70andabove |
| Pcoff26to40 | Pcoff41to55 | Pcoff56to70 | Pcoff16to25 |
| Recipient countrycode | Recipient city | Recipient pin code | Dollaroff55to40 |
| Recipient gender | Recipient statecode | Recipient tscreated | Recipient age |
| Recipient Country | Recipient State | Count(broadlogrcp) | Recipient tsmodified |
| Count (trackinglogs) click history | Count (trackinglogs) purchase history | Count (propositionrcp) offer propositions | Count(trackinglogs) open history |

FIG. 5

FOR FILTER 1

| FEATURE VECTOR | KPI CONTRIBUTION |
|---|---|
| FEATURE VECTOR 1 | 0.8 |
|  |  |
| FEATURE VECTOR N | 0.9 |

602

. . .

FOR FILTER M

| FEATURE VECTOR | KPI CONTRIBUTION |
|---|---|
| FEATURE VECTOR 1 | 0.7 |
|  |  |
| FEATURE VECTOR N | 0.9 |
| FEATURE VECTOR N+1 | 0.4 |

| FILTER | WORDS/FEATURE VECTORS WITH POSITIVE IMPACT | WORDS/FEATURE VECTORS WITH NEGATIVE IMPACT |
|---|---|---|
| FILTER 1 | A, B, C | D, E |
|  |  |  |
| FILTER N | B, G, H | I, J, C |

METHOD AND APPARATUS FOR GENERATING PREDICTIVE INSIGHTS FOR AUTHORING SHORT MESSAGES

BACKGROUND

With an increase in online marketing, authoring marketing messages has become a challenge. A marketer prefers a message that has a high key performance indicator (KPI). Examples of KPI include open rate of a message, click-through rate of a message, and conversion rate of a message. In order to author messages with high KPI, the marketer would like to have pre-emptive insights to improve the KPI. Also, the marketer would prefer to have some post-priori diagnosis to determine how the message performed on the KPI and what contributed to or hampered performance of the message on the KPI.

The above-mentioned problem increases when the message is a short message, such as a subject line of an electronic mail. It becomes highly challenging to determine the pre-emptive insights and provide post-priori diagnosis for the short message. Various techniques exist that make an attempt to provide some insights to the marketer but they fall short of meeting needs of the marketer.

In one existing technique, tracking is performed to determine how different messages performed in past. The past performance of the messages is then used to indicate to the marketer which message among current messages authored by the marketer is better. However, the technique falls short in indicating why one message is better than other and leaves a marketer wondering regarding the same. Further, the technique does not consider KPI while indicating one message being better than other. It may be possible that the better message results in high value for one KPI, such as open rate of message, but may not result in high value for another KPI, such as conversion rate of a message. Hence, it is desired to provide insights that are tailored specifically for a particular KPI that the marketer considers to be of importance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for generating predictive insights for authoring short message is provided.

In one embodiment, the method includes receiving a message to be sent as an input. Key performance indicator (KPI) whose value is to be predicted for the message is identified from the input or marketing tool configuration. A plurality of feature vectors of the message are generated. KPI contributions for the plurality of feature vectors are determined using feature vectors of messages sent in past and tracked KPI values of the messages sent in past. The KPI contribution is a measure of contribution of feature vector to value of the KPI. Value of the KPI for the message is predicted by applying determined KPI contributions to the plurality of feature vectors.

Apparatus for substantially performing the method as described herein is also provided.

BRIEF DESCRIPTION OF THE DRAWINGS

FIG. 5 is a diagram illustrating feature vectors of a message, according to one or more embodiments;

FIG. 6A and FIG. 6B illustrate tables stored for generating predictive insights for messages, according to one embodiment;

Figure 1:
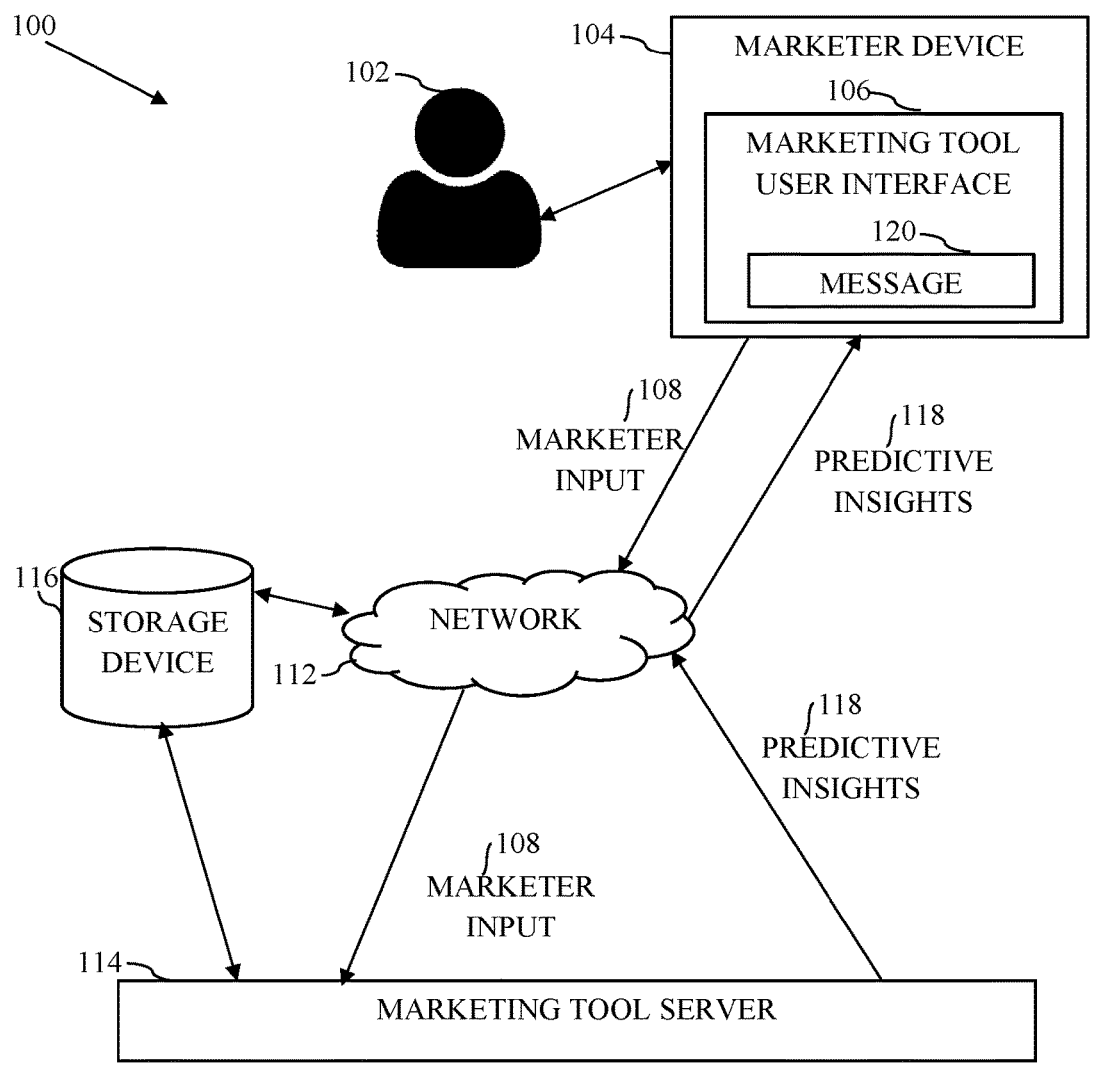
FIG. 1 is a diagram of an environment for generating predictive insights for authoring messages, according to one or more embodiments.

While the method and apparatus is described herein by way of example for several embodiments and illustrative drawings, those skilled in the art will recognize that the method and apparatus provided herein is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Moreover, although the terms "step" and/or "block" are used herein to connote different elements of methods employed, the terms should not be interpreted as implying any particular order among or between various steps herein disclosed unless and except when the order of individual steps is explicitly described.

DETAILED DESCRIPTION OF EMBODIMENTS

Overview

In accordance to embodiments of the present invention and as described in more detail below, a method for generating predictive insights for a message is provided. Examples of the message includes subject line of an email message, a push message, or any other short message that meets a pre-defined length specified or configured by a marketer or any other entity involved in process.

In one embodiment, the marketer desires to send a marketing email including a message, i.e. a subject line. The marketer uses a tool for sending the marketing email. Example of the tool includes a marketing tool that enables management of marketing emails. The marketer authors the message to be sent, and desires to know predictive insight for the message to improvise and ensure that the message results in high key performance indicator (KPI). In addition to providing the message as an input, the marketer may provide other inputs too.

The tool processes the input from the marketer. In one example, the marketer also specifies the KPI that is of importance to marketer and for which the marketer desires a maximum value. Examples of the KPI include, but are not limited to, open rate of a message, click-through rate of a message, and conversion rate of a message. Alternatively, if the marketer does not specify the KPI then the KPI is identified from the tool configuration.

The tool then processes the message to be sent based on the KPI for which the marketer desires the maximum value. The tool selects a predictive model for predicting value of the KPI for the message. Different predictive models exist for different KPIs. Different models may exist based on different filters, such as KPIs, audience segments, industry verticals, geographical location or any other filter that defines a concept. The predictive model is selected based on filters inputted by the marketer and applied to the message to be sent. The predictive model generates the insights and provides the insights to the marketer. The insights include a predicted value for the KPI. Hence, the problem is solved by providing pre-emptive insights to the marketer based on which marketer can take action to further improvise the value of the KPI. In addition, the insights provided are based on the KPI for which the marketer desires maximum value.

The tool generates the predictive models by tracking messages sent in the past and tracking KPI values for the messages. The KPI value is determined or tracked by tracking activities, such as emails or messages opened, emails or messages delivered or any other pre-defined activity, associated with the message. The KPI value is calculated as number of messages opened per 100 sent or revenue generated per 100 messages, or using any other pre-defined metric. The tracked KPI values and the tracked messages are then used to generate a predictive model for the KPI using machine learning technique. For example, feature vectors are generated for a message sent in past and are fed into a machine learning tool along with corresponding KPI value determined for the message. Several sets of messages and KPI values are used to train the machine learning tool to generate the predictive model. The predictive model includes a functional relationship among KPI value and feature vectors. The predictive model also includes coefficients, i.e. KPI contributions, for various feature vectors. Each KPI contribution is a value indicating contribution of the feature vector to the KPI. The generated feature vectors and corresponding KPI value for each message are processed to determine a KPI contribution of each feature vector. The determination of KPI contribution is performed, and the values of the KPI contribution are stored for extraction and processing as per need, i.e. for determination of predictive insights for the subject line to be sent. In various embodiments, the KPI is a function of feature vectors. An equation of form $$KPI = \text{Function}[m1 \text{ and feature vector } 1, m2 \text{ and feature vector } 2, \ldots, mN \text{ and feature vector } N] + C(\text{a constant})$$

is solved to determine values of coefficients, i.e. KPI contributions, m1, m2, . . . , mN by inputting generated feature vectors for messages sent in past and corresponding KPI values. The coefficients, i.e. KPI contribution, indicates contribution of feature vector to the KPI. In one embodiment, higher the value of coefficient higher is the contribution of the feature vector to the KPI and higher the KPI.

Value of the KPI contribution differs for different feature vectors and may also be similar for some feature vectors but not all. The KPI contributions of respective feature vectors present in the feature vectors of the message to be sent are then applied on the feature vectors of the message to be sent to predict value of KPI. The feature vectors, i.e. the plurality of feature vectors, of the message to be sent are subset of the feature vectors of the messages sent in past. The predicted value of the KPI for the message is then provided to the marketer. Thus, valuable predictive insights that are a function of KPI are provided to the marketer.

In various embodiments, different values of KPI contribution for same feature vector across different filters indicate different predictive models. In some embodiments, the filters include KPIs and different predictive models are determined for different KPIs. For determining the predictive model or KPI contributions based on filters, the messages that satisfy common filters are clustered to form a cluster. For example, messages sent to an "audience segment 1" and corresponding to a "KPI 1" are clustered into one cluster. In another example, messages sent to an "audience segment 2" and corresponding to the "KPI 1" are clustered into another cluster. In yet another example, to messages sent to an "audience segment 1" and corresponding to a "KPI 2" are clustered into yet another cluster. The messages in a particular cluster are then processed to determine predictive model specific to that cluster, i.e. a particular combination of filters. Clustering helps in increasing accuracy of predictive insights as the predictive model is not generic but based on messages satisfying particular filters.

In one embodiment, the determination of KPI contributions or predictive models is performed offline and values are stored for later extraction. In another embodiment, the determination of KPI contributions or predictive models can be performed in real time.

Terms Descriptions (in Addition to Plain and Dictionary Meaning of the Terms)

A marketer is a person that manages marketing activities of an entity. The marketing activities include authoring and sending message to desired audience or any other form of communication to desired audience. A marketer, typically, uses a marketing tool for performing the marketing activities.

A message is an electronic communication sent to a desired audience. In one embodiment, the message includes a subject line of email or a push message. In another embodiment, the message includes any short message, such as electronic posts, electronic notifications, electronic messages, and the like, meeting a predefined length as specified by the marketer or configured in the marketing tool.

A marketing tool is an electronic product enabling management of marketing activities including authoring and sending of marketing messages or running a marketing campaign. The marketing tool, typically, includes a user interface and allows marketer to provide various inputs for authoring messages and managing them. Example of the marketing tool includes but is not limited to Adobe® Campaign.

A feature vector represents various features of a message and may also include delivery information of the message. A feature vector can be one single feature vector or can be combination of one or more feature vectors. Several feature vectors defining a single concept can be referred to as one feature vector. For example, "experience" words such as "think", "love" and "find" can be together referred to as one feature vector. Feature vectors of the message can be generated using various techniques. In one embodiment, a language parser can be used for generating the feature vectors of the message. Based on an English language parser, several word lists are generated, each corresponding to a different Part-of-Speech. Various types of language parser or various techniques can be used for generating the feature vectors or the word lists. One example of the technique for generating the feature vectors or the word lists includes using LIWC, i.e. linguistic inquiry and word count technique. Each word lists include 30-35 words or characters or symbols describing or defining a single concept. Each of such word list is referred to as one feature vector. If the message includes a word from a particular word list then the feature vector corresponding to the word list is said to be present in the message.

A key performance indicator (KPI) indicates performance of a message. In one embodiment, higher the value of the KPI better is the performance of the message. Examples of the KPI include, but are not limited to, open rate of a message, click-through rate of a message, and conversion rate of a message.

A filter is a parameter using which the messages are clustered into a cluster. The filter defines a concept using which the messages can be clustered. Examples of the filters include, but are not limited to, audience segments, industry verticals, geographies, category of words, and KPIs. There can be more than one filter and different combination of filters result in different clusters of messages. For example, messages sent to an "audience segment 1" and corresponding to a "KPI 1" are clustered into one cluster. In another example, messages sent to an "audience segment 2" and corresponding to the "KPI 1" are clustered into another cluster. In yet another example, to messages sent to an "audience segment 1" and corresponding to a "KPI 2" are clustered into yet another cluster. In still another example, the filter can include category "experience". The messages having words, such "think", "touch", and "taste", from "experience" category can be clustered into one cluster. The category of words indicates a group of words which collectively mean something specific, or themes of messages. There are many methods to identify if the message satisfies the filter or not. In one example, if same word exists in the message and same word exists in the filter category then the message satisfies the filter criterion. In another example, the filter criterion can be met by looking at relationships between the word in the message and the words in the filter category.

An audience segment is a segment of target recipients of a message. The audience can be created by the marketer or is automatically created. The audience segment is a segment of audience that meets one or more requirements specified by the marketer or configured in the tool or other sources. For example, the requirement can be age group and hence, audience segment can be based on age group. The audience segment can also be based on the category "experience" to include audiences that mainly uses "experience" words in messages. Examples of "experience" words include, but are not limited to, "think", "touch", and "taste". Similarly, the requirement can be to include audiences that mainly uses "definitive" words, such as "certain", "can", "will" and so on, in the message.

A KPI contribution is a measure of contribution of a feature vector to KPI. In one embodiment, the KPI is a function of feature vectors. An equation of form $$\text{KPI} = \text{Function } [m1 \text{ and feature vector } 1, m2 \text{ and feature vector } 2, \ldots, mN \text{ and feature vector } N]$$

is solved to determine values of coefficients, i.e. KPI contribution, m1, m2, . . . , mN by inputting generated feature vectors for messages sent in past and corresponding KPI values. In illustrated embodiment, higher the value of coefficient higher is the contribution of the feature vector to the KPI and higher the KPI.

A predictive model is a functional relationship among KPI and feature vectors, and includes coefficients (KPI contributions) indicating contribution of feature vectors to the KPI. One predictive model differs from another predictive model if value of a KPI contribution is different for at least one feature vector. Different predictive models exist for different clusters.

A first plurality of feature vectors or a plurality of feature vectors refer to the feature vectors generated for a message to be sent.

A second plurality of feature vectors refer to the feature vectors generated for various messages sent in past. For example, if message 1 sent in past has feature vectors 1 to 10 and message 2 sent in past has feature vectors 5 to 15 then the second plurality of feature vectors include feature vectors 1 to 15.

In the following discussion, an "Example Environment" is first described that is operable to employ methods described herein. Following this, a section entitled "Example Apparatus" describes an example apparatus in accordance with one or more embodiments. "Example Method" describes an example method in accordance with one or more embodiments.

Example Environment

FIG. 1 is a diagram of an environment 100 for generating predictive insights for authoring messages, according to one or more embodiments.

The environment 100 includes a marketer 102 having a marketer device 104. The marketer 102 accesses a marketing tool user interface 106 via the marketer device 104. Examples of the marketer device 104 include, but are not limited to, computer, laptop, smartphone, notebook, tablet, or any other device having at least one processor to receive input from the marketer 102 and to provide output to the marketer 102. The marketing tool user interface 106 can be a part of a web portal or web service or marketing tool, such as Adobe® Marketing Cloud or Adobe® Campaign, provided over a browser and to which the marketer 102 has subscribed. Various other options, for example in form of a client side application or a plugin, of providing access of the marketing tool to the marketer 102 can be used. The marketing tool provides various functionalities, including authoring of a message 120 to the marketer 102. In one embodiment, the message 120 is a subject line of an email, such as a marketing email. In another embodiment, the message 120 is a push message. In yet another embodiment, the message 120 is a short message having a predefined length specified by the marketer 102 or configured in the marketing tool. The marketer 102 provides the message 120 as a marketer input 108 to the marketing tool. The marketer input 108 can also include other details, such as one or more filters including audience segment, target key performance indicator (KPI), or other information related to the marketing campaign.

The marketer device 104 is connected to a marketing tool server 114 via a network 112. The marketer input 108 is sent to the marketing tool server 114 by the marketing tool. The marketing tool server 114 processes the marketer input 108 including the message 120 to generate predictive insights 118. Various examples of the processing by the marketing tool server 114 are explained in conjunction with FIG. 2 to FIG. 13. For processing, the marketing tool server 114 accesses data stored in a storage device 116 directly or via the network 112. The predictive insights are then provided to the marketer 102 via the marketing tool user interface 106.

Example Apparatus

Functional Description of Apparatus

Figure 2:
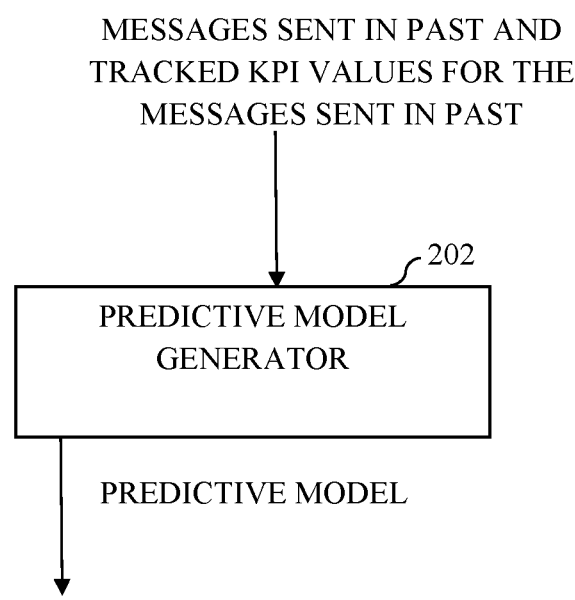
FIG. 2 is a block diagram of an apparatus for generating predictive model, according to one embodiment.

FIG. 2 is a block diagram of an apparatus, such as the marketing tool server 114, for generating predictive model, in accordance to one embodiment.

The marketing tool server 114 includes a predictive model generator 202. The predictive model generator 202 receives or accesses messages sent in past and KPI values of the messages sent in past. The predictive model generator 202 machine learns using the messages sent in past and using tracked or determined KPI values to generate a predictive model for predicting KPI value of an input message.

Figure 3:
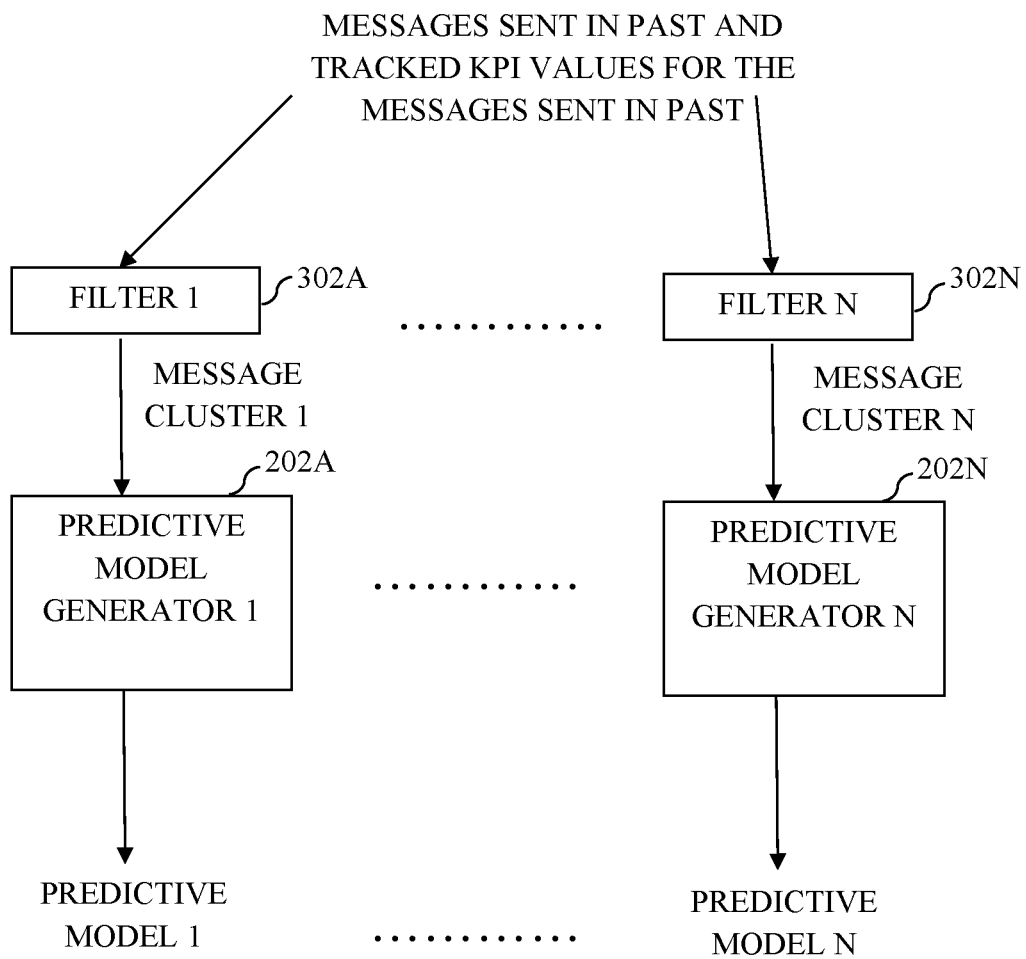
FIG. 3 is a block diagram of an apparatus for generating predictive models, according to another embodiment.

Different predictive models are generated for different filters as shown in FIG. 3. Referring to FIG. 3, the messages sent in past are further filtered based on different filters, for example filter 302A to filter 302N. Different clusters of messages are created based on messages satisfying different filter criteria. All messages satisfying common filters are clustered into same cluster. For example, messages that meet criteria of "Filter 1" are clustered as "Message Cluster 1" and similarly, messages that meet criteria of "Filter N" are clustered as "Message Cluster N". "Message Cluster 1" is then used to generate "Predictive Model 1" by a predictive model generator 202A and "Message Cluster N" is used to generate "Predictive Model N" by a predictive model generator 202N.

In one example, filter includes KPI. Messages specific to a particular KPI, i.e. "KPI 1" are used to generate "predictive model 1" for "KPI 1" by inputting the messages specific to the "KPI 1" to the predictive model generator 202A. Similarly, "predictive model N" is generated for "KPI N" by inputting the messages specific to the "KPI N" to the predictive model generator 202N. Different predictive models are generated based on any other filter as desired. A filter is defined as any concept based on which messages can be clustered. The clustered messages shares commonality specific to the concept. Messages that meet the filter criteria are inputted to the predictive model generator 202 to generate the predictive model specific to the filter criteria. Generating predictive models specific to the filter criteria helps in accurate predictions. The predictive models are then stored by the predictive model generator 202 for later access.

Figure 4:
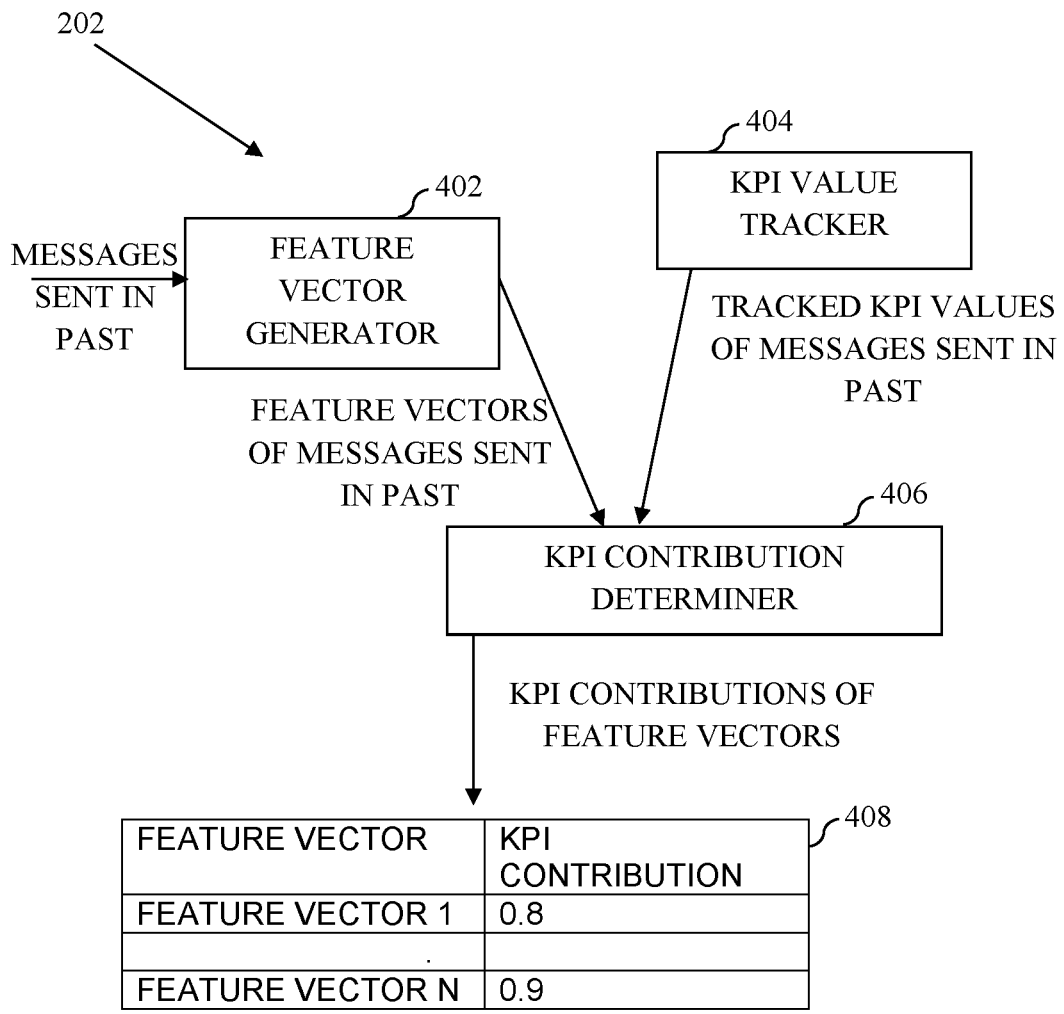
FIG. 4 is a block diagram of a predictive model generator, according to one embodiment.

Referring to FIG. 4 now, the predictive model generator 202 is described in detail. The predictive model generator 202 includes a feature vector generator 402. The feature vector generator 402 receives or accesses messages sent in past and generates feature vectors for each message. The messages can be processed one after another or in parallel. Cluster wise processing of messages can also be performed. The feature vectors are generated using various techniques, for example language parser. Based on language parser several word lists are generated. Each word lists include 30-35 words or characters or symbols describing or defining a single concept. Each of such word lists is referred to as one feature vector. If the message includes a word from a particular word list then the feature vector corresponding to the word list is said to be present in the message.

FIG. 5 is a diagram illustrating feature vectors 502 of a message, for example the message 120 or the messages sent in past. Table 500 includes feature vectors and each cell in the table 200 represents a feature vector. The feature vectors 502 represent various features of a message and may also include delivery information of the message. The feature vector can be one single feature vector or can be combination of one or more feature vectors. Several feature vectors defining a single concept can be referred to as one feature vector. For example, "experience" words such as "think", "love" and "find" can be together referred to as one feature vector "experience". Feature vectors 502 of the message 120 can be generated using various techniques. The feature vectors 502 can be specific to different filters to ensure accurate predictive insights. Different tables, based on requirement or specific needs, can be generated and stored in the storage device 116.

The predictive model generator 202 also includes a KPI value tracker 404 for tracking or determining KPI values of messages sent in past. The KPI value is determined or tracked by tracking activities, such as emails or messages opened, emails or messages delivered or any other predefined activity, associated with the message. The KPI value is calculated as number of messages opened per 100 sent or revenue generated per 100 messages, or using any other pre-defined metric.

The predictive model generator 202 includes a KPI contribution determiner 406 for receiving the feature vectors of the messages sent in past and tracked KPI values of the messages sent in past. The KPI contribution determiner 406 determines the KPI contribution, i.e. the predictive model, by solving an equation of following form.

$$\text{KPI}=\text{Function}[m1 \text{ and feature vector}1, m2 \text{ and feature vector}2, \ldots, mN \text{ and feature vector } N]+C$$

is solved to determine values of coefficients, i.e. KPI contribution, m1, m2, . . . , mN by inputting generated feature vectors for messages sent in past and corresponding KPI values. The coefficients, i.e. KPI contributions, indicate contribution of feature vector to the KPI. In one embodiment, higher the value of coefficient higher is the contribution of the feature vector to the KPI and higher the KPI. The KPI contribution determiner 406 then stores the KPI contributions for different feature vectors in the storage device, such as the storage device 116, as a table 408 for later access.

Referring to FIG. 6A now, in some embodiments, the KPI contribution determiner 406 determines different KPI contributions for a feature vector for different filters and stores them as tables in the storage device 116. Table 602 includes feature vectors and corresponding KPI contributions for the feature vectors for "filter 1". Similarly, table 604 includes feature vectors and corresponding KPI contributions for the feature vectors for "filter M". Determining KPI contribution for the feature vector based on the specific filters helps in achieving better accuracy. This is because the messages sent in past on basis of which the KPI contribution is generated is selected from a pool of messages that are sent in past and that satisfy the specific filters. This gives more realistic values of the KPI contribution attributing to success of the message for that specific filter. For example, the marketer of a sports company desires to author messages with feature vectors that have high KPI contribution for the sports audience segment rather than using generic feature vectors.

Figure 7:
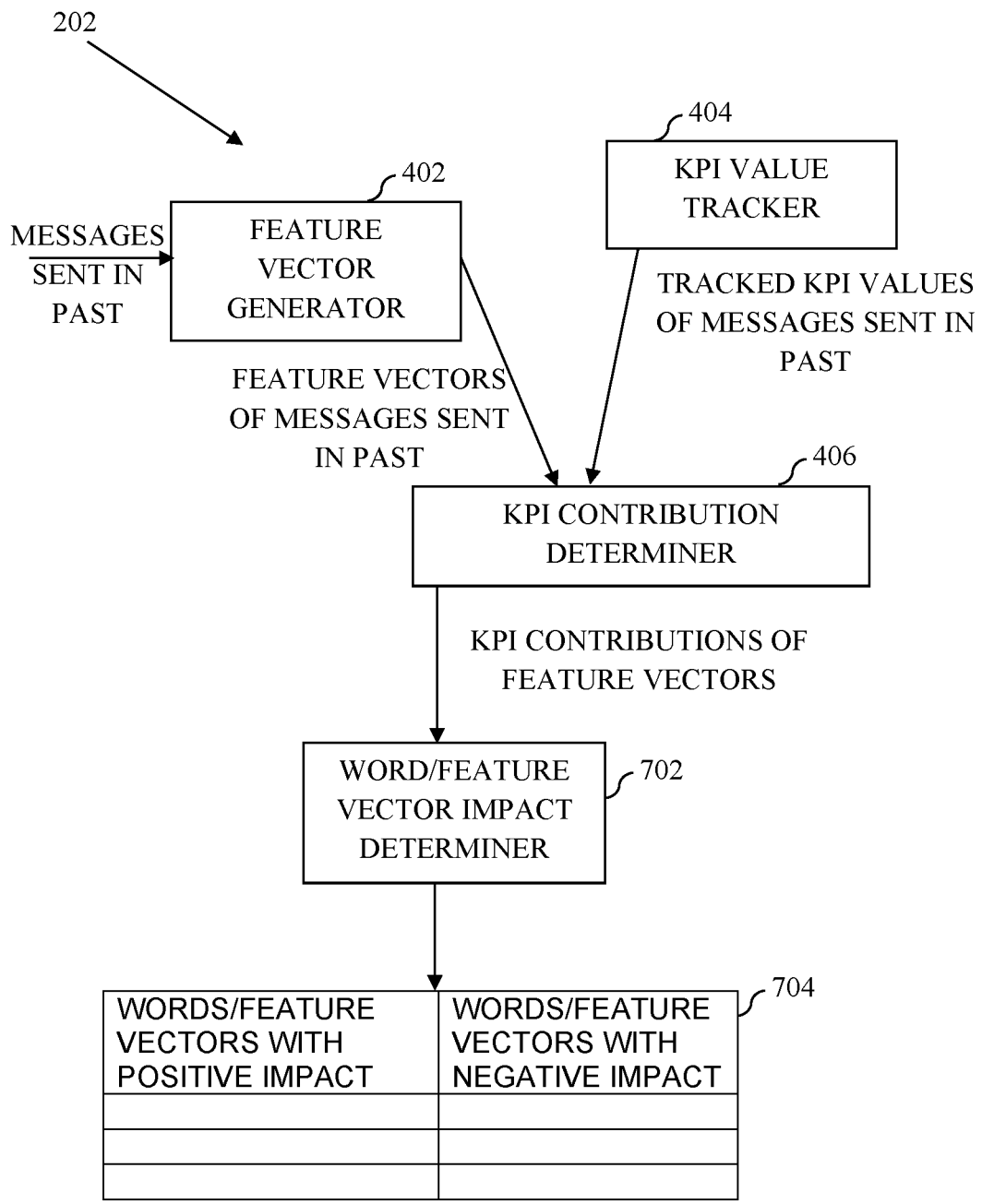
FIG. 7 is a block diagram of a predictive model generator, according to another embodiment.

Referring to FIG. 7 now, in some embodiments, the predictive model generator 202 includes word or feature vector impact determiner 702 for further dividing the feature vectors into two categories based on the KPI contribution. If the KPI contribution of the feature vector is high, i.e. having positive impact on the message and greater than or equal to a threshold, then the feature vector is identified as good feature vector. If the KPI contribution of the feature vector is low, i.e. having negative impact on the message and lesser than the threshold, then the feature vector is identified as bad feature vector. While storing the feature vectors are stored into different categories, i.e. good feature vector and bad feature vector, as shown in table 704. For each filter, the impact of the words or the feature vectors are stored as shown in table 606 of FIG. 6B. Table 606 indicates that a same feature vector or word "C" can have negative impact for "filter N" while it can have a positive impact for "filter 1". This helps in achieving high accuracy as the processing is based on specific filter, i.e. KPI in some embodiments.

While it is indicated that higher KPI contribution indicates that the feature vector is good, it is appreciated that based on setting and configuration of the tool changes can be done to define what KPI contribution is considered to conclude that corresponding feature vector is good or bad. Such configuration may vary based on different parameters, for example based on different audience segments.

Figure 8:
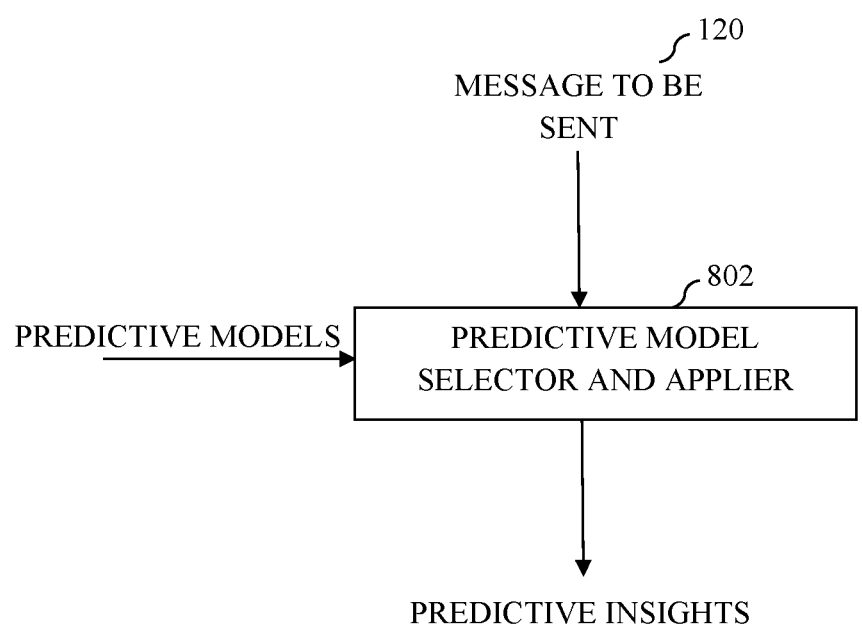
FIG. 8 is a block diagram of an apparatus for generating predictive insights, according to one embodiment.

FIG. 8 is a block diagram of an apparatus for generating predictive insights, according to one embodiment.

The marketing tool server 114 also includes a predictive model selector and applier 802 then receives the message 120 to be sent from the marketer. In one embodiment, a filter is not specified by the marketer 102 and the predictive model selector and applier 802 extracts a default predictive model and applies the default predictive model to the message 120 to be sent to generate predictive insights for the message 120 to be sent.

Figure 9:
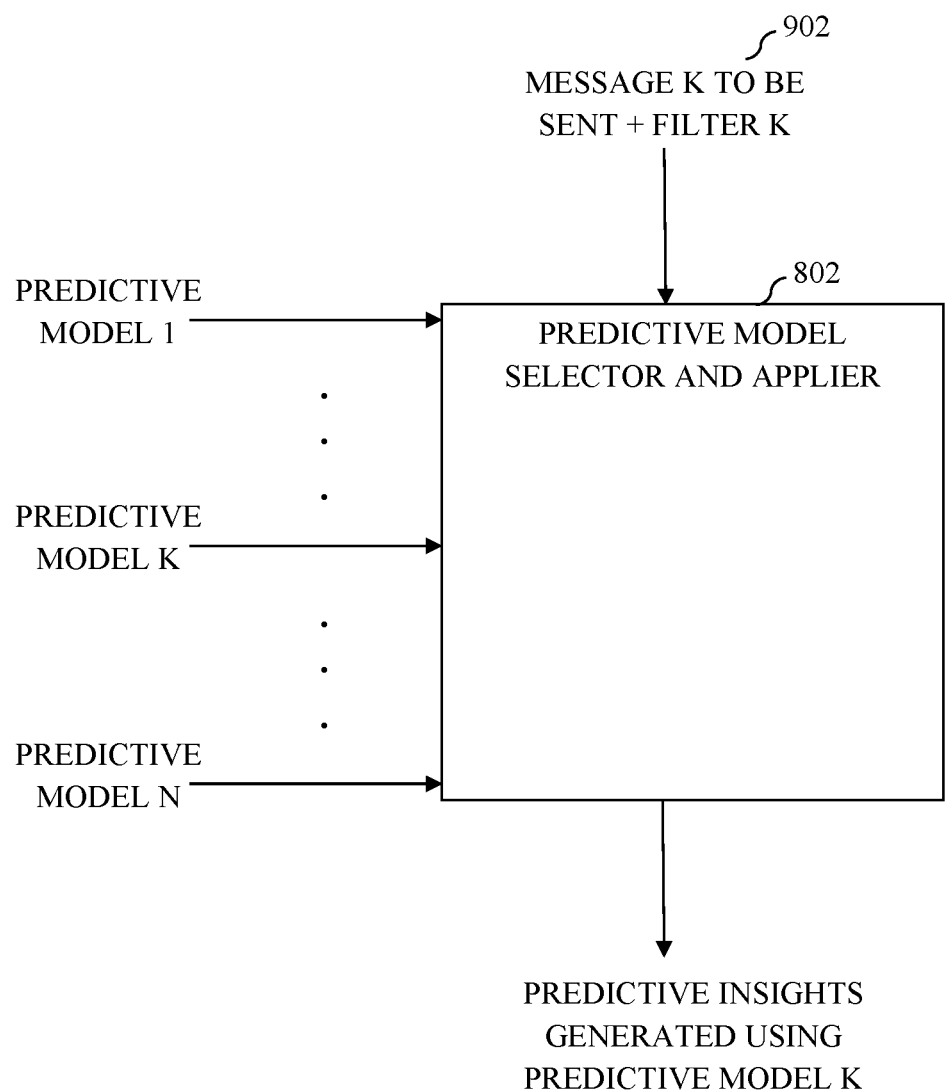
FIG. 9 is a block diagram of an apparatus for generating predictive insights, according to another embodiment.

Referring to FIG. 9 now, in another embodiment, the filter is specified by the marketer 102 and the predictive model selector and applier 802 extracts the predictive model specific to the filter and applies the extracted predictive model to a message 902 to be sent to generate predictive insights for the message 902 to be sent. The marketer 102 specifies a "filter K" 902 and the predictive model selector and applier 802 extracts the "predictive model K" for applying to the "message K" 902. The predictive insights are then generated using the "predictive model K".

The predictive model selector and applier 802 helps generate accurate insights by selecting the predictive model that meets filters inputted by the marketer 102. The predictive insights include a value for desired KPI.

Figure 10:
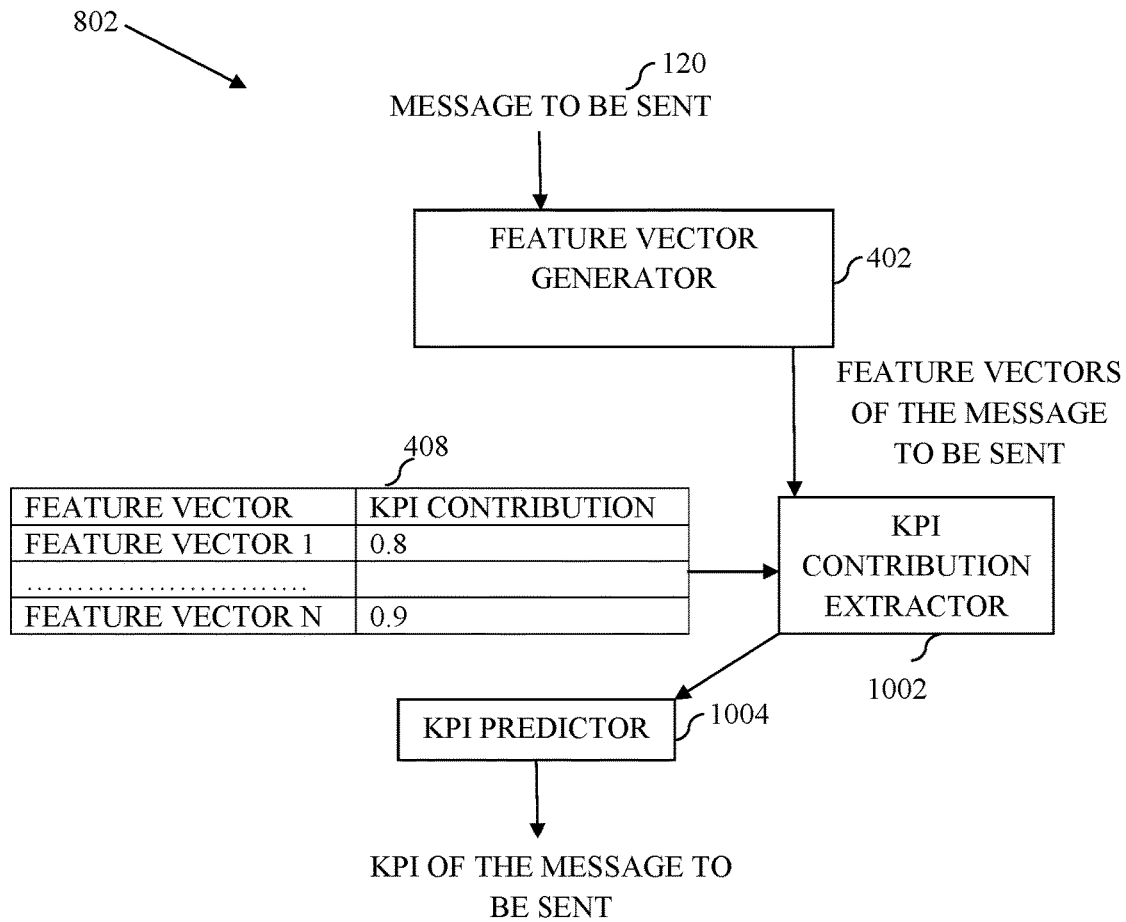
FIG. 10 is a block diagram of a predictive model selector and applier, according to one embodiment.

The predictive model selector and applier 802 is now explained in reference to FIG. 10. The predictive model selector and applier 802 includes the feature vector generator 402 for receiving the message 120 to be sent. The feature vector generator 402 generates feature vectors for the message 120 to be sent. A KPI contribution extractor 1002 then extracts KPI contributions for the feature vectors of message 120 to be sent. The KPI contribution extractor 1002 accesses the storage device 116 and identifies the table 408 including feature vectors and corresponding KPI contributions. Table 408 indicates one KPI contribution for one feature vector. A KPI predictor 1004 then applies the extracted KPI contributions to the feature vectors of the message 120 to be sent to predict the KPI value of the message 120 to be sent. The predicted KPI is then provided to the marketer.

Figure 11:
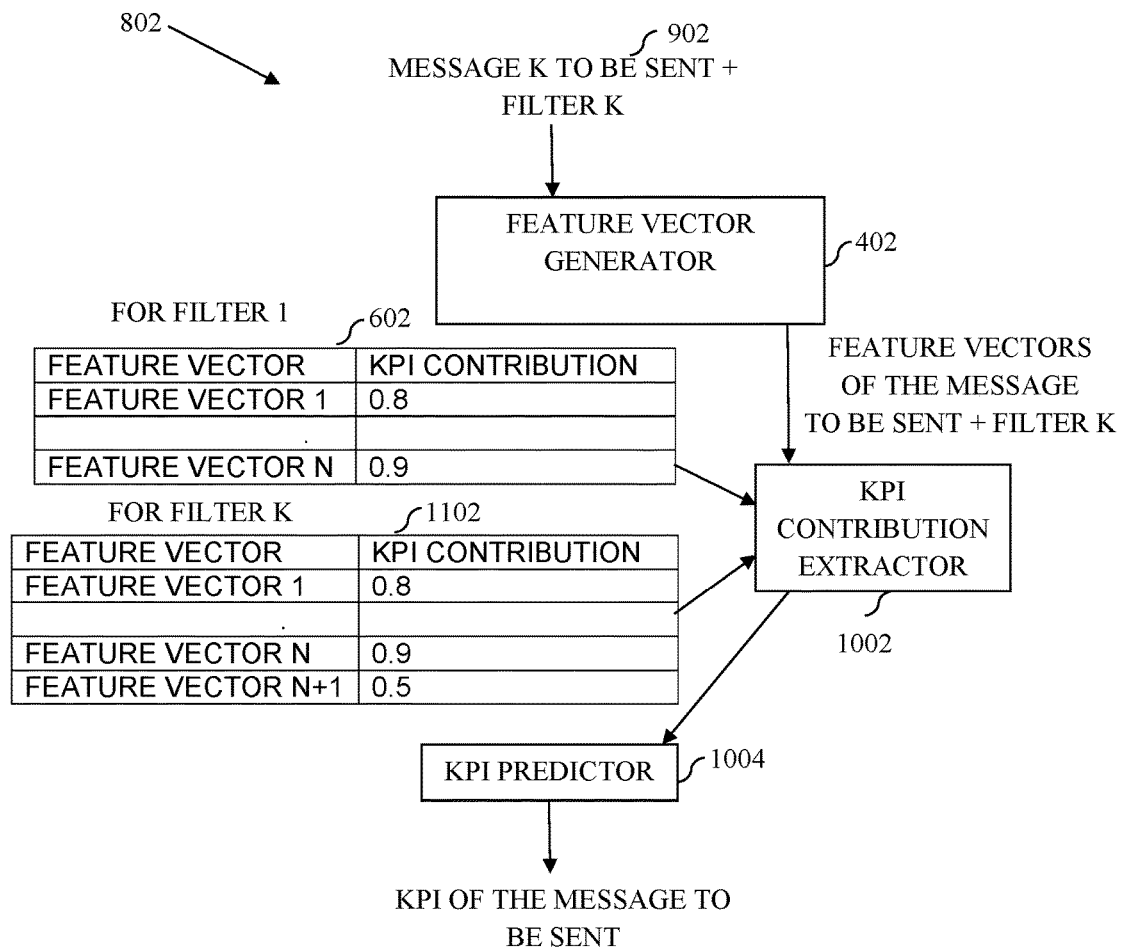
FIG. 11 is a block diagram of a predictive model selector and applier, according to another embodiment.

If the marketer input 108 includes a specific filter, such as the "filter K" 902 then the KPI contributions specific to the filter are extracted and applied. Referring to FIG. 11 now, the marketer 102 inputs the "message K" 902 and the "filter K" 902. The KPI contribution extractor 1002 then extracts the KPI contributions specific to the "filter K" 902. The KPI contribution extractor 1002 has access to different tables having the KPI contributions for different filters stored in the storage device 116. Table 1102 is extracted by the KPI contribution extractor 1002 in illustrated embodiment. The KPI predictor 1004 then applies the KPI contributions from table 1102 to the feature vectors of the "message K" 902 to be sent and predicts the KPI of the "message K" 902 to be sent. If no filter is specified in the marketer input then a default or generic KPI contributions, such as in table 408 are extracted and applied.

Figure 12:
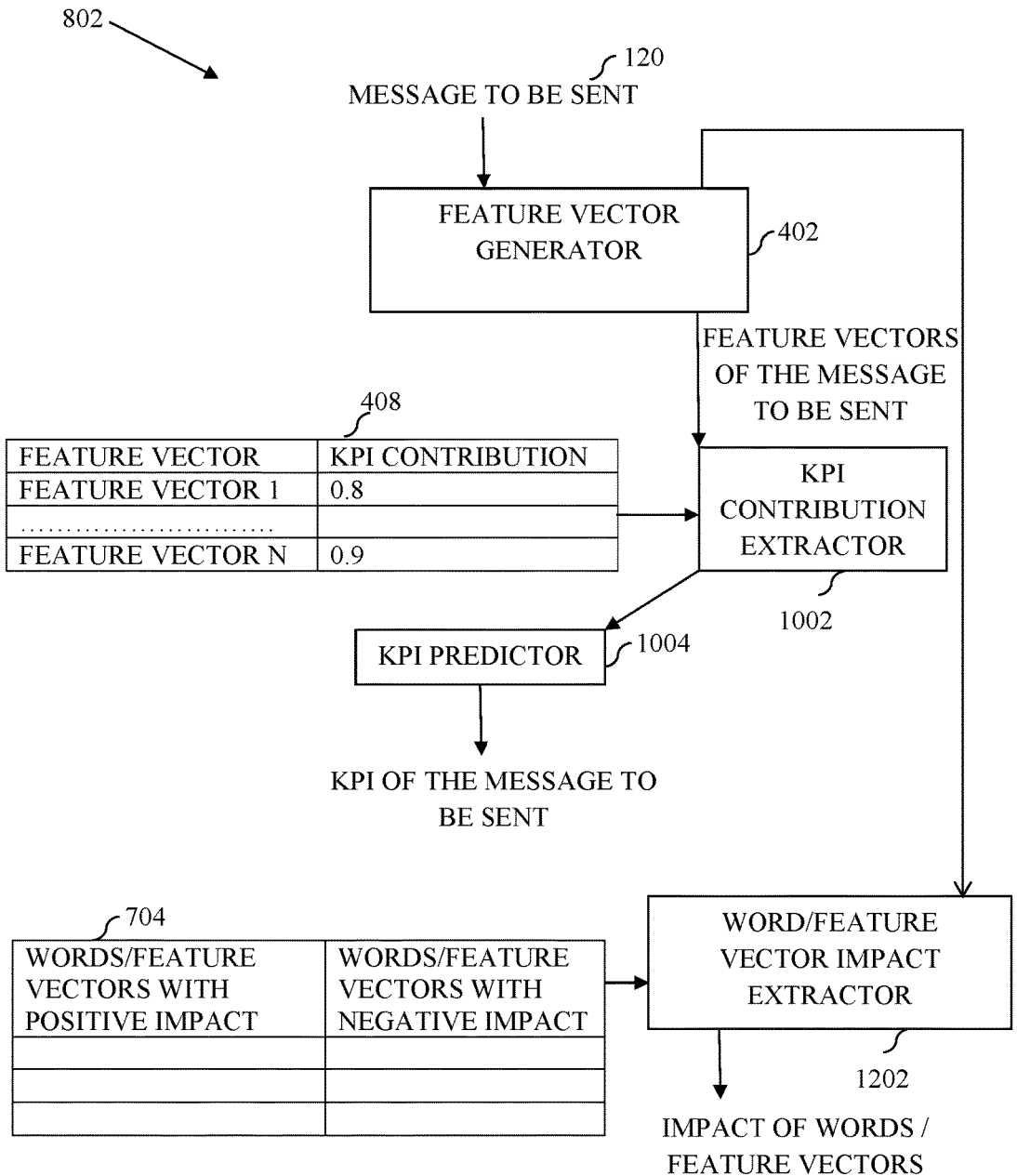
FIG. 12 is a block diagram of a predictive model selector and applier, according to yet another embodiment.

Referring to FIG. 12 now, the portion or words of the message 120 corresponding to feature vectors that have positive impact on the message 120 are identified using a word or feature vector impact extractor 1202 and indicated to the marketer 102. Similarly, the portion or words of the message 120 corresponding to the feature vectors that have negative impact on the message 120 are indicated to the marketer. The word or feature vector impact extractor 1202 accesses the storage device 116 and extracts the table 704. Using the table 704 the word or feature vector impact extractor 1202 indicates the impact to the marketer 102. Various techniques for indicating the impact can be used. For example, highlighting, different colors, different fonts, different sizes and the like, can be used for different words to indicate different impact. It will be appreciated that the impact indication can again be based on filters. Table, such as table 606 can be used to indicate the impact based on the filter of the message 120.

In some embodiments, the marketer 102 may choose to alter the message 120 based on indication of impact of the portions of the message 120. Alternatively, recommendation of words can be made to the marketer 102 to replace words that impact the message 120 negatively. In one embodiment, the words that have high KPI contributions are recommended. In another embodiment, the marketer input 108 is classified according to the presence of filters in the marketer input 108. N-gram and clausal analysis of the messages sent in past are performed using existing techniques to identify top bigrams, trigrams and clauses in each cluster of the messages. The predictive model generation or the KPI contribution determination includes performing N-gram and clausal analysis to identify top bigrams, trigrams and clauses. In other words, the top bigram, trigrams and clauses correspond to feature vectors with high KPI contribution. When the marketer enters the marketer input 108, suggestion is made at three levels 1) of the filter that the message is missing, and the relative impact the filter will have on the predicted KPI, 2) of text snippets or phrases which exemplify the filter based on the marketer input 108, and 3) a more fine-grained suggestion of how to replace a discouraged word with one of 1) or 2), based on a syntactic, semantic and categorical analysis of the message 120 to be sent and a syntactic, semantic and categorical analysis of filters and historical usage.

If an alteration is made then the KPI predictor 1004 predicts the KPI of altered message and provides it to the marketer 102.

Figure 13:
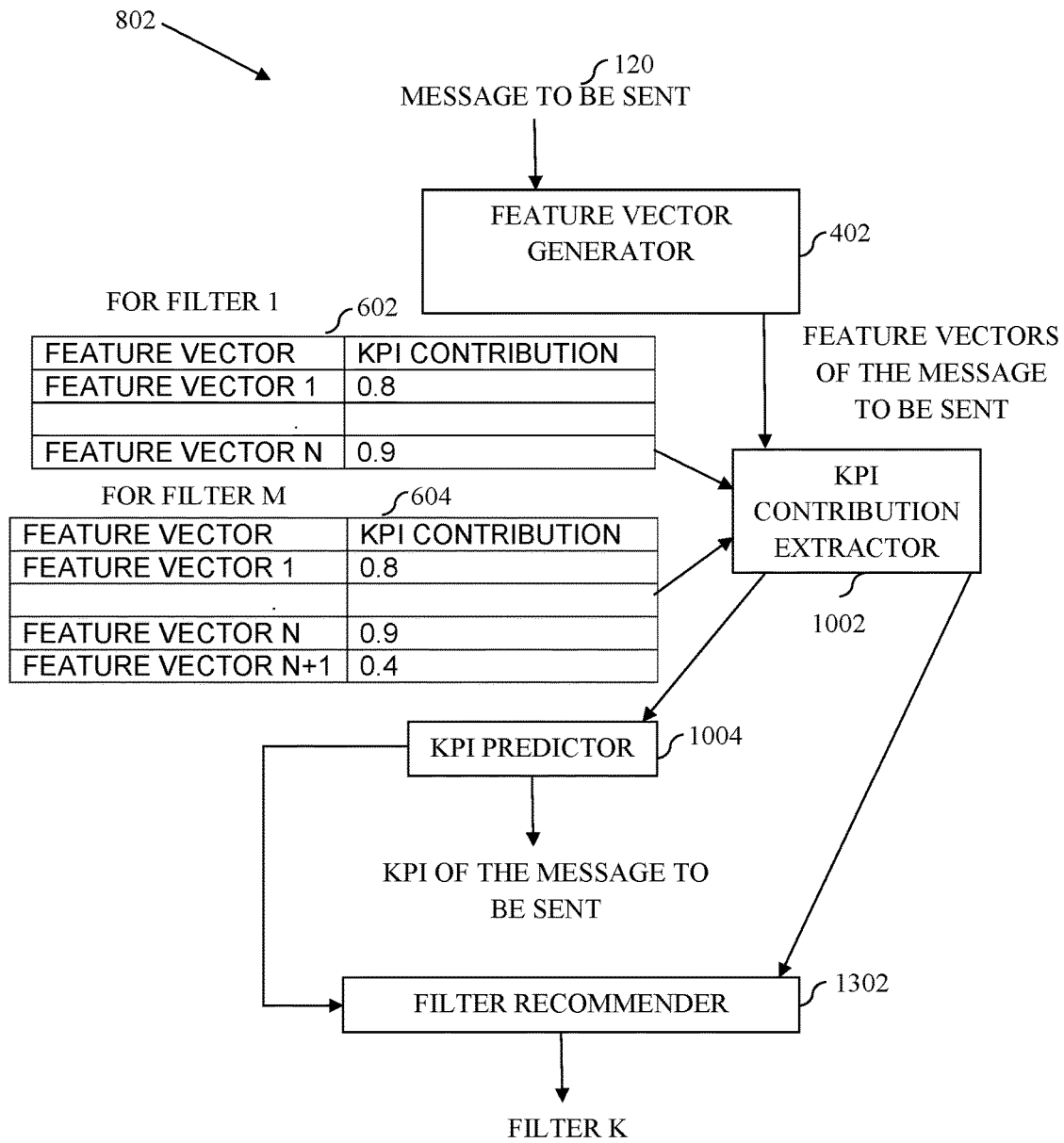
FIG. 13 is a block diagram of a predictive model selector and applier, according to still another embodiment.

Referring to FIG. 13 now, in some embodiments, the predictive model selector and applier 802 also includes a filter recommender 1302. The filter recommender 1302 determines presence of number of feature vectors of the message 120 in each filter. In one example, filter recommender 1302 recommends the filter having presence of highest number of feature vectors of the message 120 to be sent. In another example, filter recommender 1302 recommends the filter having presence or count of highest number of feature vectors of the message 120 to be sent in good feature vectors list.

It will be appreciated that determination of KPI contribution including processing of messages sent in past can be done offline or in real time. Also, different steps involved in processing of the messages sent in past can be done offline or in real time, i.e. partial steps processed offline while partial steps processed in real time. In one embodiment, determination of KPI contributions is done offline and determined KPI contributions are stored in the storage device 116 for accessing, when needed. In another embodiment, the messages and corresponding KPIs or the feature vectors and corresponding KPIs are stored in the storage device 116 and determining of the KPI contributions is performed in real time, i.e. when the message 120 is received by the marketing tool server 114.

The predicted value of the KPI is then provided to the marketer 102 via the marketing tool user interface 106. In addition to predicted value of the KPI, other insights are also provided. For example, words or phrases of the message along with impact they have on the KPI, suggestions for incorporation in the message to enhance the KPI and filter recommendation if the filter is not provided in the marketer input 108.

Hardware Description of Apparatus

Figure 14:
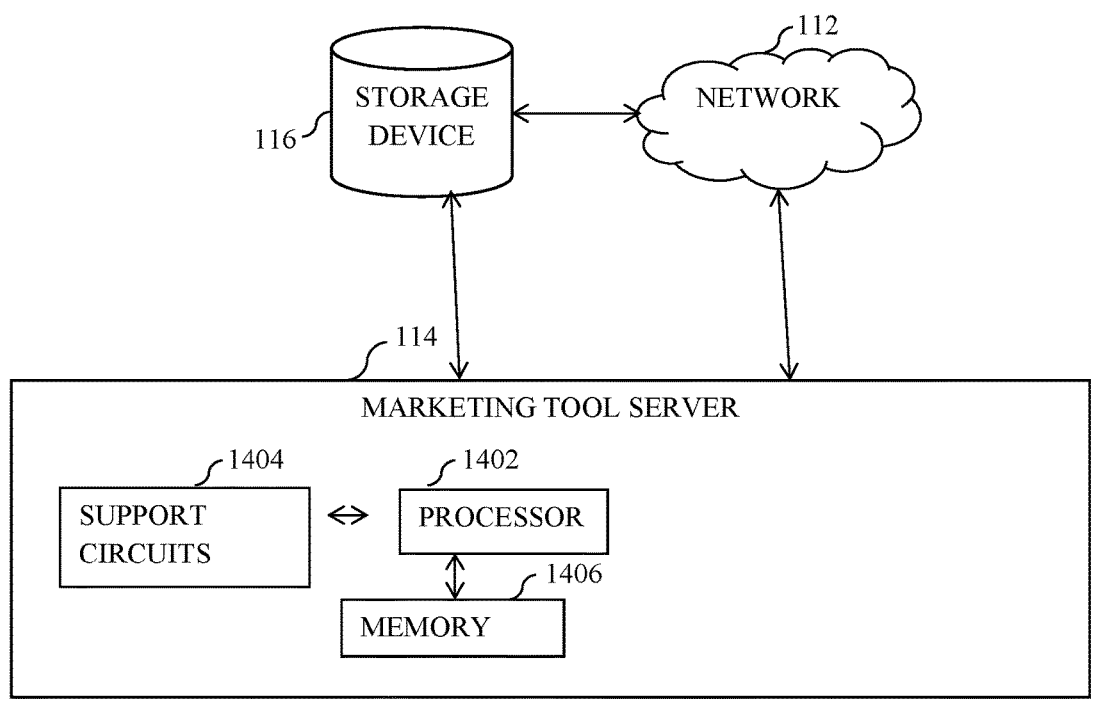
FIG. 14 is a block diagram of an apparatus for performing methods described herein, according to one or more embodiments.

FIG. 14 is a block diagram of an apparatus, such as the marketing tool server 114, for generating predictive insights for the message 120, according to one or more embodiments.

The marketing tool server 114 is connected to the storage medium or device 116 via the network 112, or directly. The marketing tool server 114 can be present at one single location or can be present at different locations in a distributed environment. One or more marketing tool server 114 may be utilized to carry out embodiments described herein. Each marketing tool server 114 is capable of accessing the Internet, such as the World Wide Web. The marketing tool server 114 takes on a variety of forms, such as a personal computer (PC), a server, a desktop computer, a processing unit, any combination of these devices, or any other suitable device having one or more processors. Further, the marketing tool server 114 includes one or more processors 1402, and one or more computer-readable media. The computer-readable media may include computer-readable instructions executable by the one or more processors 1402. The one or more processors 1402 further includes multiple elements, for examples as shown in FIG. 2 to FIG. 13, to perform various portions or steps of generating predictive insights of a message, such as the message 120.

The marketing tool server 114 includes one or more processors 1402 (also referred to as the processors 1402), support circuits 1404, and a memory 1406. The processors 1402 include one or more commercially available microprocessors or microcontrollers that facilitate data processing and storage. The various support circuits 1404 facilitate operation of the processors 1402 and include one or more clock circuits, power supplies, cache, input/output circuits, and the like. The memory 1406 includes at least one of Read Only Memory (ROM), Random Access Memory (RAM), disk drive storage, optical storage, removable storage or the like. The memory 1406 includes an operating system, and a processing engine. The operating system 1406 includes various commercially known operating systems.

The marketing tool server 114 may further include one or more input devices (not shown in FIG. 14) connected to the marketing tool server 114. Examples of the one or more input devices include, but are not limited to, peripheral devices, keyboard, mouse etc. In some embodiments, the marketing tool server 114 may not be connected to the input devices separately and may have functionalities of these input devices built into the marketing tool server 114, such as in cases in which the marketing tool server 114 is touch enabled device, gesture enabled device, or paired to such similar devices that act as the input devices.

The storage device 116 is, for example, a storage drive or a storage system, or a distributed or shared storage system. In some embodiments, the storage device 116 is coupled to a processing device (not shown) to facilitate extraction or retrieval or access of data stored in the storage device 124, or is directly accessible by the marketing tool server 114.

Examples of the network 112 include, but are not limited to, internet, local area network (LAN), wireless area network, wired area network etc.

The algorithms and methods for performing various operations of the marketing tool server 114 are now explained in conjunction with example methods.

Example Methods

Figure 15:
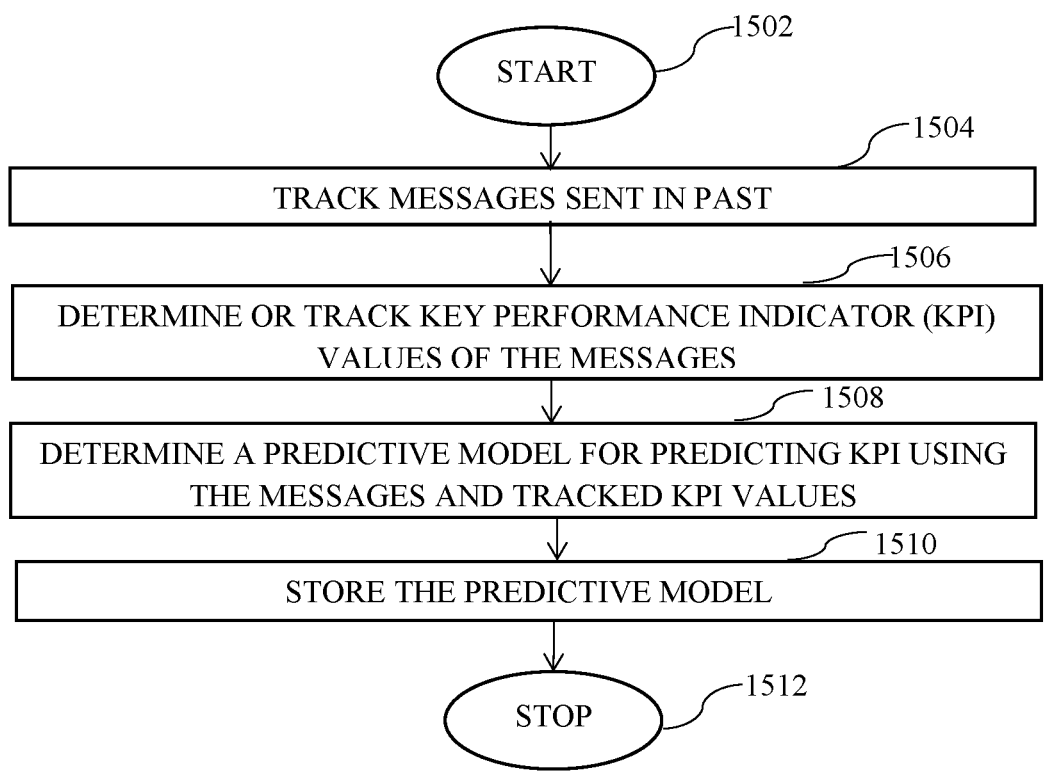
FIG. 15 is a flowchart of a method for generating predictive model, according to one embodiment.

FIG. 15 is a flowchart of a method for generating predictive model, according to one embodiment.

The method starts at step 1502 and proceeds to step 1504.

At step 1504, messages sent in past are tracked. The messages may be sent by the marketer, such as the marketer 102, via the marketing tool server, such as the marketing tool server 114.

At step 1506, values of the KPI for the messages are determined. One value of the KPI is determined for each message.

At step 1508, a predictive model is generated using the messages and determined or tracked KPIs.

The predictive model is then stored at step 1510. In some embodiments, the predictive model stored at step 1510 is a generic model and is independent of any particular filter. The generic model helps in predicting insights for the message for which no particular filter is specified.

The method stops at step 1512.

Figure 16:
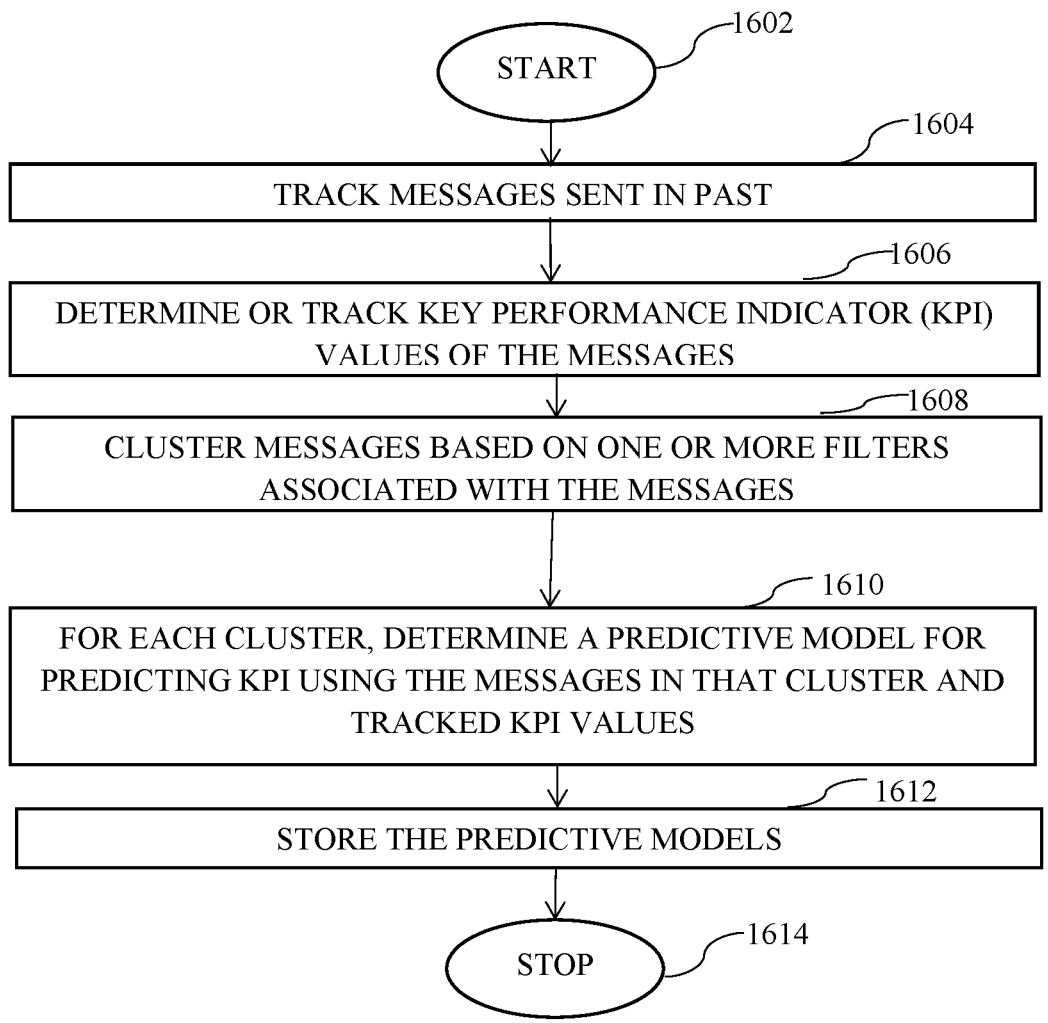
FIG. 16 is a flowchart of a method for generating predictive models, according to one embodiment.

FIG. 16 is a flowchart of a method for generating predictive models, according to one embodiment.

The method starts at step 1602 and proceeds to step 1604.

At step 1604, messages sent in past are tracked.

At step 1606, values of the KPI for the messages are determined. The tracked messages are clustered, at step 1608, into different audience segments, KPIs, or based on various filters. Messages that meet criteria specified by the filters are clustered into one cluster. If a message meets filter criteria for more than one cluster then that message can be included in all clusters for which the message meets the criteria.

At step 1610, one or more predictive models are generated using the messages and using determined or tracked KPIs. One KPI is tracked for each message for one cluster. One predictive model is generated per filter. In some embodiments, at least two predictive models are generated. The predictive models are then stored at step 1612 for later access. Each stored predictive model is specific to filter criteria and is meant for providing predictive insights for message that meet the specific filter criteria. Specific predictive model for specific filter criteria helps in achieving high accuracy in predicting insights for the message to be sent and that meets the filter criteria.

The method stops at 1614.

Figure 17:
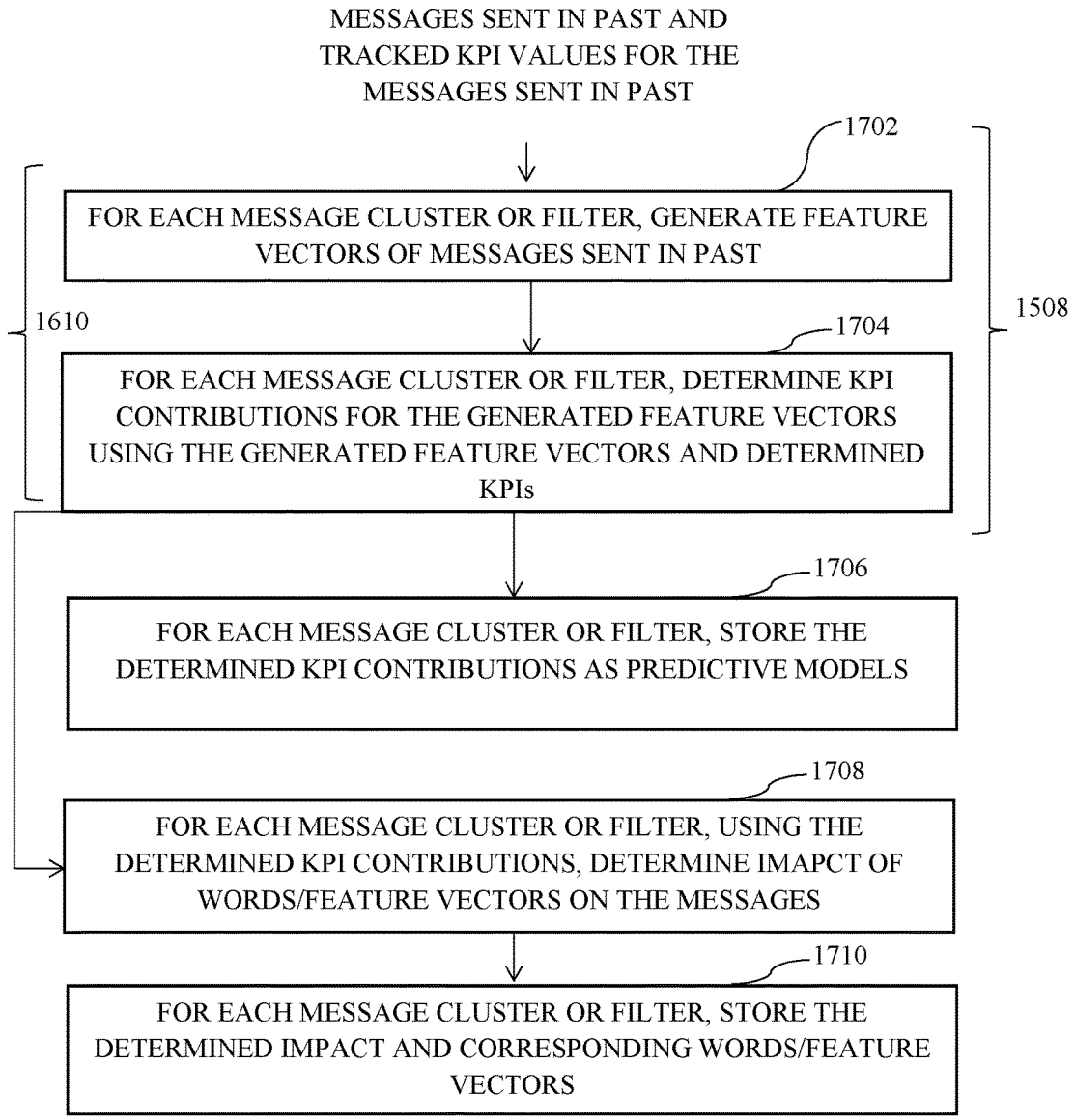
FIG. 17 is a flowchart of a method for generating predictive models, according to another embodiment.

FIG. 17 is a flowchart of a method for generating predictive models, according to another embodiment.

The method, at step 1702, receives messages sent in past and tracked or determined KPI values for the messages sent in past. In one embodiment, the messages may be clustered into various clusters based on various filters. In another embodiment, the messages are not clustered due to absence of any filter. The messages are processed to generate feature vectors of the messages. Feature vectors of each message are generated. The feature vectors can be generated using LIWC or any language parser.

At step 1704, KPI contributions are determined for the generated feature vectors using the generated feature vectors and using the tracked or determined KPI values. For any message sent in past, the generated feature vectors are subset of or equivalent to the total feature vectors of all the messages sent in past. If cluster based processing is performed then for any message sent in past in the cluster, the generated feature vectors are subset of or equivalent to the total feature vectors of all the messages sent in past in that cluster. One KPI contribution is generated for one feature vector for one cluster. For different clusters, different KPI contributions are generated for one feature vector. If no cluster or filter exists, then a default or generic KPI contribution is determined for one feature vector.

The KPI contributions are then stored, at step 1710, as predictive models for use as per need. If clusters exist, then the KPI contributions are stored as a predictive model for one cluster. One predictive model exists for one cluster. One predictive model includes feature vectors of the cluster and corresponding KPI contribution for each feature vector. If no cluster or filter exists, then a default or generic predictive model including KPI contributions for various feature vectors is stored. One KPI contribution exists for one feature vector in the default or generic predictive model.

In some embodiments, at step 1708, impact of the feature vectors on the message is also identified and the words corresponding to the feature vectors having positive or negative impact on the value of the KPI are stored. The KPI contribution indicates the type, i.e. positive or negative, of the impact. In one embodiment, if the KPI contribution is higher than it indicates a positive impact on the KPI value. If the KPI contribution is lower than it indicates a negative impact on the KPI value. For example, the words corresponding to the feature vectors that have KPI contribution greater than a predefined value are considered as the words having positive impact on the KPI value and the words corresponding to the feature vectors that have KPI contribution lesser than the predefined value are considered as the words having negative impact on the KPI value. It is to be appreciated that the impact can be determined as per configuration of the marketing tool server 114. The words or feature vectors along with their impact are determined for each cluster, i.e. messages that meet similar filter criteria, at step 1708 and then stored at step 1710. The same feature vector or word may have different impact based for different clusters. If no cluster or filter exists, then a default or generic table including impact of the words or the feature vectors is stored.

Figure 18:
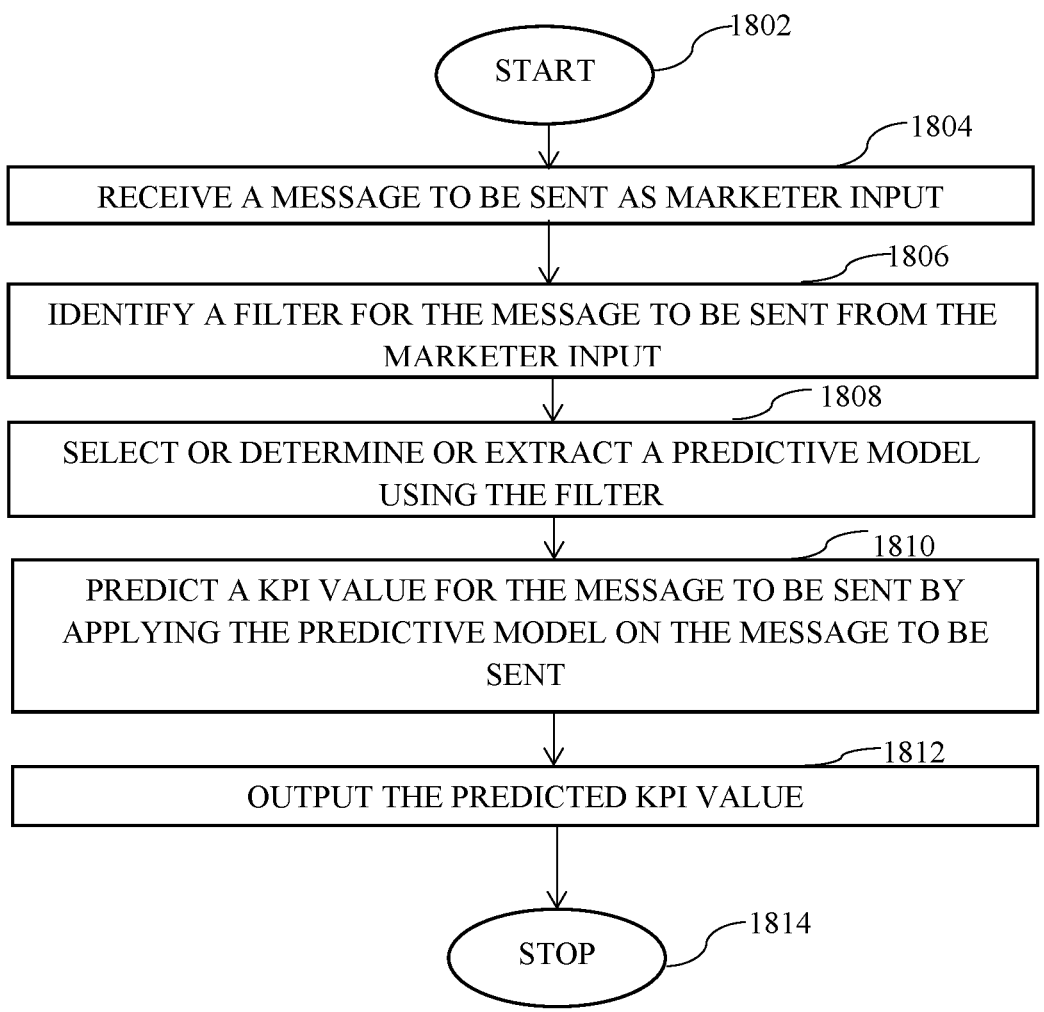
FIG. 18 is a flowchart of a method for generating predictive KPI, according to one embodiment.

FIG. 18 is a flowchart of a method for generating predictive KPI, according to one embodiment.

The method starts at step 1802.

At step 1804, message to be sent is received as marketer input from the marketer. The marketer can provide other inputs including KPI, audience segment, or any other filter which are identified at step 1806. In one embodiment, the filter identified at step 1806 is a subset of one or more filters used for clustering at step 1608 of FIG. 16. Identifying filter includes identifying KPI. If no filter is inputted then a KPI is identified from configuration of the marketing tool server, such as the marketing tool server 114.

At step 1808, a predictive model is extracted or determined or selected using the filter. In one embodiment, the predictive model is already generated and stored offline as described earlier. The predictive model that meets the filter criteria determined at step 1806 is selected and extracted at step 1808. In another embodiment, the predictive model is generated in real time using the filter. The method for generating predictive model in real time remains the same as the method for generating predictive model offline. For example, in real time the messages sent in past are accessed and clustered based on the filter. The messages sent in past and tracked KPI values are then processed to determine predictive model, i.e. KPI contributions.

If no input filter is identified, at step 1806, then default or generic predictive model is selected and extracted or determined in real time, at step 1808.

At step 1810, the predictive model is applied on the message to be sent to predict a KPI value for the message to be sent. The predicted KPI value is then outputted at step 1812. Outputting includes displaying the predicted KPI value to the marketer via the marketing tool user interface.

The method stops at step 1814.

Figure 19:
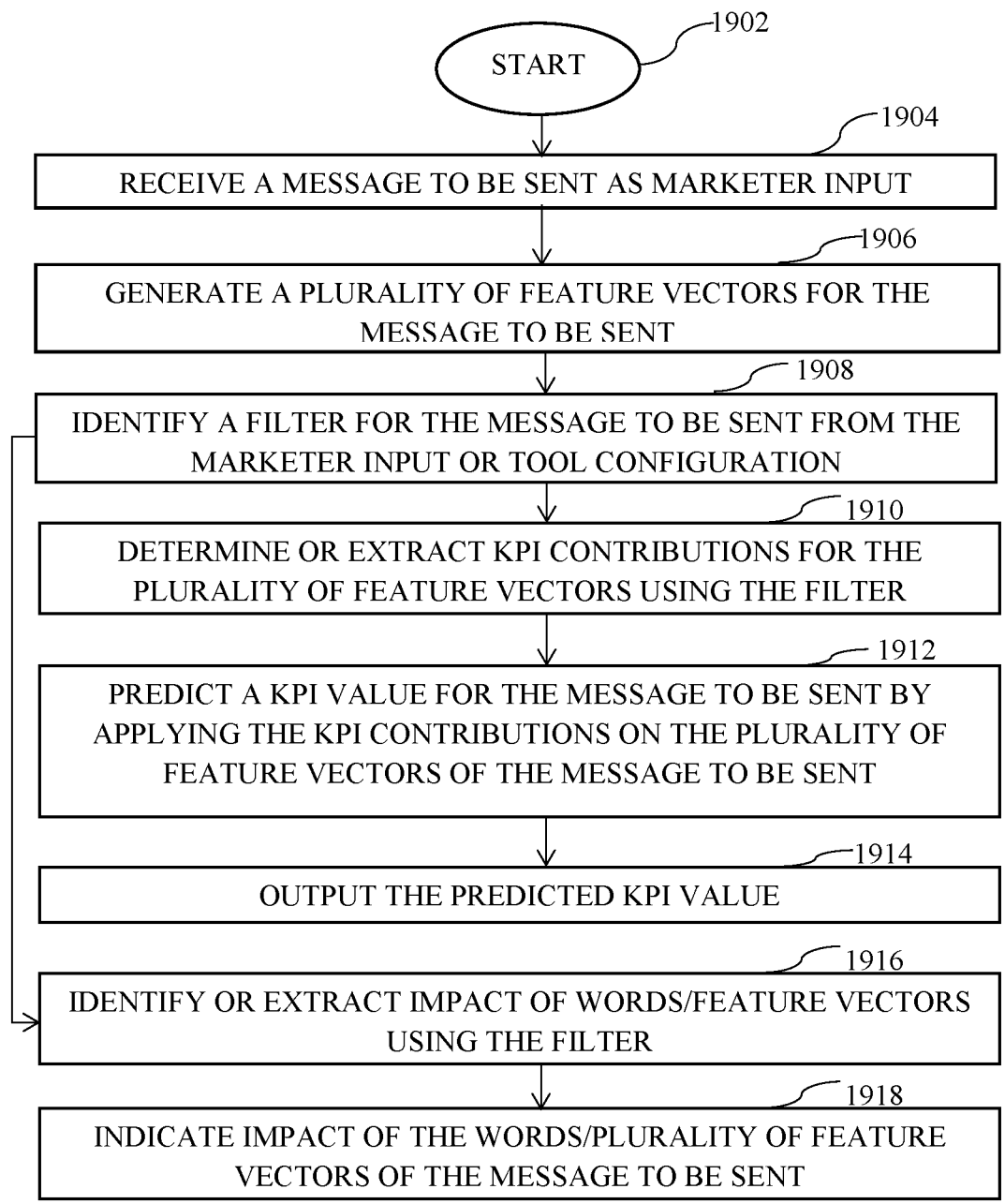
FIG. 19 is a flowchart of a method for generating predictive insights, according to one embodiment.

FIG. 19 is a flowchart of a method for generating predictive insights, according to one embodiment.

The method starts at step 1902.

At step 1904, message to be sent is received as marketer input from the marketer. The marketer can provide other inputs including KPI, audience segment, or any other filter which are identified at step 1908. In one embodiment, the filter identified at step 1908 is a subset of one or more filters used for clustering at step 1608 of FIG. 16. Identifying filter includes identifying KPI whose value is to be predicted for the message to be sent. The KPI or the filter is identified from the marketer input. If no filter is inputted then a KPI is identified from configuration of the marketing tool server, such as the marketing tool server 114.

At step 1906, a plurality of feature vectors of the message to be sent are generated. In some embodiments, the plurality of feature vectors are a subset of or equivalent to the feature vectors generated from the messages sent in past.

At step 1910, KPI contributions for the plurality of feature vectors are extracted or selected or determined using the filter or the KPI. In one embodiment, the KPI contributions are determined offline as described earlier. In another embodiment, the KPI contributions are determined in real time. The method for determining KPI contributions in real time remains same as that used for determining KPI contributions offline. The KPI contributions are determined using feature vectors of the messages sent in past and tracked KPI values of the messages sent in past. The KPI contributions for the plurality of feature vectors constitute a predictive model for the plurality of feature vectors.

Using the filter for the message to be sent, the KPI contributions are selected and extracted, or determined for the cluster including the messages sent in past and that meet the filter criteria. The messages sent in past that meet the filter criteria identified for the message to be sent are used for determining or extracting KPI contributions. If no filter is identified the default or generic KPI contributions are extracted or determined.

At step 1912, the KPI value for the message to be sent is predicted by applying the KPI contributions selected and extracted, or determined at step 1910 to the plurality of feature vectors of the message to be sent. The KPI value is then outputted at step 1914.

In some embodiments, at step 1916, the impact of one or more feature vectors of the plurality of feature vectors or words of the message to be sent are identified or extracted. The impact of the words or the feature vectors are then indicated to the marketer at step 1918. The impact can be extracted using the filter. In one embodiment, the cluster that includes messages meeting the filter criteria is identified and the table including impact of the words or the feature vectors stored for that cluster is extracted. In another embodiment, the impact is determined in real time using the same method as that used offline.

In some embodiments, the marketer may choose to alter the message to be sent based on indication of impact of the portions of the message. Alternatively, recommendation of words can be made to the marketer to replace words that impact the message negatively. In one embodiment, the words that have high KPI contributions for that cluster or as default are recommended. In another embodiment, the marketer's input is classified according to the presence of filters in the input. N-gram and clausal analysis of the messages sent in past are performed using existing techniques to identify top bigrams, trigrams and clauses in each filter or audience segment or category of the messages. The predictive model generation or the KPI contribution determination includes performing N-gram and clausal analysis to identify top bigrams, trigrams and clauses. In other words, the top bigram, trigrams and clauses correspond to feature vectors with high KPI contribution. When the marketer enters the input, suggestion is made at three levels 1) of the filter that the message is missing, and the relative impact the filter will have on the predicted KPI, 2) of text snippets or phrases which exemplify the filter, and 3) based on the marketer's input, a more fine-grained suggestion of how to replace a discouraged word with one of 1) or 2), based on a syntactic, semantic and categorical analysis of the message to be sent and a syntactic, semantic and categorical analysis of categories or filters or audience segments and historical usage.

It will be appreciated that the suggestion of the words can be based on cluster if the filter is inputted by the marketer or can be based on default filter from configuration of the marketing tool server if no filter is inputted by the marketer.

If an alteration is made then the value of the KPI for altered message is predicted and provided to the marketer. Also, the change in KPI, i.e. uplift or drop in the KPI of the message, that was to happen if the negative impact words were to be removed or the positive impact words were to be removed is also indicated.

In some embodiments, additional insights are also provided to the marketer. The additional insight includes indicating variance in the KPI value with respect to mean value of the KPI for a particular cluster of messages. One example of providing the variance, i.e. uplift or drop, in the KPI value for the particular cluster of messages includes providing a variance in performance for different quartiles of data. The quartile of data indicates subset of a value of filter. For example, if the filter is number of recipients of the message then quartile includes percentage of recipients to whom message is sent. For example, when an AB testing of the message to be sent is performed and the message is sent to 3% recipients of total recipients, i.e. first quartile of data then a variance from how the cluster ideally performed against how the message is performing based on tracking of the message sent is provided. The cluster's ideal performance is pre-calculated using the values of the KPI tracked for the messages. The variance in different quartiles can be provided to the marketer to help marketer assess the variation with respect to the cluster of messages.

In some embodiments, the filter can also be based on type of business, for example sports, medical and so on, or based on a particular entity, for example Nike®. The marketer can specify type of business or entity for which the marketer wants to generate the predictive insights. In case the marketer wants to run a marketing campaign for a new entity such as Adidas®, i.e. to solve a cold start problem, then various embodiments provided herein can generate the predictive insights using the KPI contributions available for feature vectors for different businesses or different entities. Hence, the tool provides option to the marketer to generate both, i.e. a specific prediction for KPI or a more generic prediction for KPI. In addition to providing prediction of KPI, the tool uses data available for other entities in same business to provide recommendation to the marketer. This recommendation can be in form of how the KPI of the message to be sent stand, i.e. uplift or drop, in comparison to average value.

The method stops at step 1920.

Figure 20:
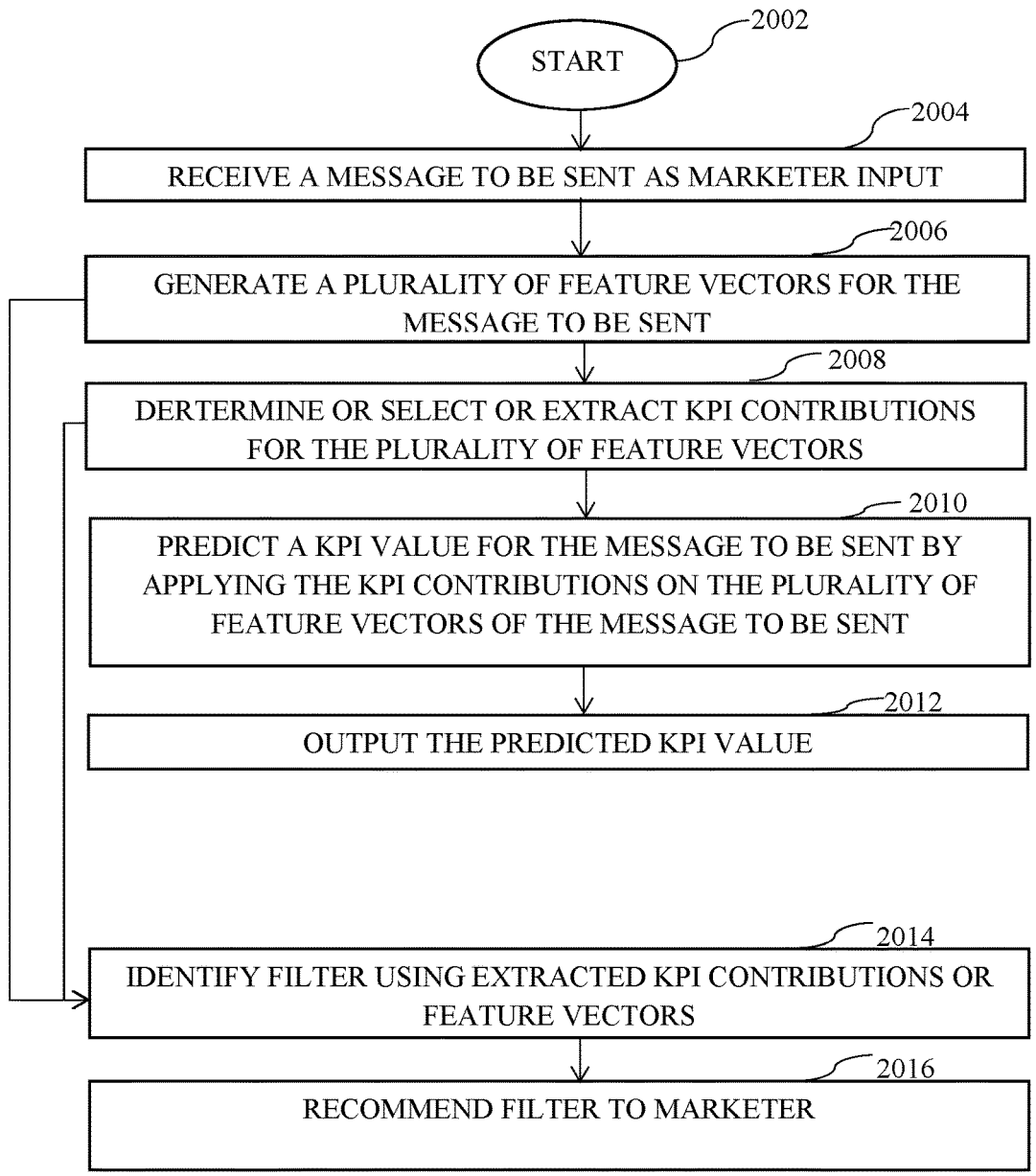
FIG. 20 is a flowchart of a method for generating predictive insights, according to another embodiment.

FIG. 20 is a flowchart of a method for generating predictive insights, according to another embodiment.

The method starts at step 2002.

At step 2004, message to be sent is received as marketer input from the marketer.

At step 2006, a plurality of feature vectors of the message to be sent are generated. In some embodiments, the plurality of feature vectors are a subset of or equivalent to the feature vectors generated from the messages sent in past.

At step 2008, KPI contributions for the plurality of feature vectors are extracted or selected or determined. In one embodiment, the KPI contributions are determined offline as described earlier. In another embodiment, the KPI contributions are determined in real time. The method for determining KPI contributions in real time remains same as that used for determining KPI contributions offline. The KPI contributions are determined using feature vectors of the messages sent in past and tracked KPI values of the messages sent in past. The KPI contributions for the plurality of feature vectors constitute a predictive model for the plurality of feature vectors.

In one embodiment, the marketer does not specify any filter and hence, default values of KPI contributions for default KPI are extracted or selected or determined. In another embodiment, only KPI is specified by the marketer in addition to the message to be sent and no other filter is specified. The KPI is the identified from the marketer input and the KPI contributions corresponding to identified KPI are selected or extracted or determined.

At step 2010, the KPI value for the message to be sent is predicted by applying the KPI contributions selected and extracted, or determined at step 2008 to the plurality of feature vectors of the message to be sent. The KPI value is then outputted at step 2012.

In illustrated embodiments, either no filter is provided by marketer or only KPI is provided by the marketer and hence, the filters are identified at step 2014 and recommended at step 2016.

In one embodiment, presence of number of feature vectors of the message to be sent in each cluster is determined. In one example, the filters corresponding to cluster having presence of highest number of feature vectors of the message to be sent is recommended. A mapping of cluster, i.e. common filters, against feature vectors present in the cluster is created and maintained. Initially, count of each cluster is set to zero. If a feature vector is present in the mapping under a cluster then count of that cluster is increased. Count for each cluster that includes the feature vector is increased. This is performed for various feature vectors. The filters of the cluster with highest count are then identified and recommended to the marketer. In some embodiments, count for only those clusters that includes the feature vector and for which the feature vector has positive impact is increased. This ensures that only those clusters are recommended for which the feature vectors have positive impact. In another example, the filter having presence or count of highest number of feature vectors of the message to be sent in good feature vectors list is recommended.

In another embodiment, the filter is recommended based on KPI contributions of different clusters. For example, different values of KPI for the message to be sent are predicted by applying KPI contributions specific to each cluster to the plurality of feature vectors. The filters of the cluster for which value of predicted KPI meets condition specified by the marketer or for which the predicted KPI value is maximum are then recommended to the marketer.

In some embodiments, suggestions are also provided to the marketer to include certain words in the message. A check is performed to determine whether the message includes or does not include words corresponding to feature vectors having high KPI contributions. The check can also be performed at cluster or any other filter or feature vector level to determine if the message includes or does not include words from the cluster or a single representative feature vector or the filter that has feature vectors with high KPI contributions. If the message does not include such words then suggestions are made to the marketer to include such words, i.e. the words corresponding to feature vectors with high KPI contributions.

In various embodiments, the message is then sent. The message or KPI of the message is tracked to determine or track actual KPI of the message after the message is sent. The actual KPI, i.e. tracked value of the KPI after the message is sent, is then used as feedback to improve future predictions of KPI value for various messages. The improvement of future predictions is achieved using various techniques, such as a machine learning technique. The actual KPI values and the predicted KPI values for various messages are used to machine learn and to develop an equation as a function of the actual KPI values and the predicted KPI values. The equation comes a step closer to being perfect every time new data, i.e. KPI values, is fed and future predictions become more accurate.

It will be appreciated that order of steps described in various embodiments can vary. For example, in some embodiments determination of KPI contribution can happen before message to be sent is received or after the message to be sent is received. Also, some of the steps can be performed in real time or offline. Other variations are also possible and are covered within scope of this description.

In some embodiments, the marketer may not provide the message to be sent. Instead the marketer may provide other filters. The messages sent in past are already clustered based on the filters. N gram and clausal analysis of the messages is also performed at time of clustering to identify n-grams, words, feature vectors and clauses. The messages, i.e. the cluster, that meet the filters inputted by the marketer are identified. One or more of following are then recommended to the marketer 1) the feature vectors to be included in the message to be sent, 2) the text snippets or phrases which exemplify the filters, and 3) top performing n-grams, clauses and words. The recommendation is based on messages meeting the filters inputted by the marketer. Any existing natural language generation system takes the recommendation as input and considers word order, syntactic rules and length constraints to generate a complete message. The generated message is then recommended to the marketer.

The embodiments of the present invention may be embodied as methods, apparatus, electronic devices, and/or non-transient or non-transitory computer program products or computer readable medium. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable medium having computer-usable or computer-readable program code embodied in the non-transient or non-transitory medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium or non-transient computer-readable medium or non-transitory computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, methods or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating predictive insights for electronic messages, the method comprising:
   receiving a message to be sent as an input;
   in response to receiving the message to be sent, generating a plurality of feature vectors for the message to be sent;
   accessing feature vectors for messages sent in the past and observed key performance indicator (KPI) values for the messages sent in the past;
   based on an analysis of the feature vectors and the observed KPI values for the messages sent in the past, determining KPI contributions, wherein the KPI contributions comprise a measure of contribution of a feature vector to a KPI value;
   predicting a KPI value for the message to be sent by applying the determined KPI contributions to the plurality of feature vectors of the message to be sent; and
   presenting the predicted KPI value and the message to be sent.

2. The method as claimed in claim 1, wherein the message to be sent is at least one of:
   a subject line of a marketing message; or
   a push message.

3. The method as claimed in claim 1, wherein the plurality of feature vectors of the message to be sent area subset of the feature vectors of messages sent in the past.

4. The method as claimed in claim 1, further comprising generating the plurality of feature vectors for the message to be sent by:
   passing the message to be sent through a language parser.

5. The method as claimed in claim 1 and further comprising:
   identifying one or more filters associated with messages sent in the past;
   clustering messages sent in the past based on the one or more filters, wherein the messages in a given cluster have common filters; and
   for each cluster, determining KPI contributions of feature vectors of messages in that cluster.

6. The method as claimed in claim 5, wherein determining the KPI contributions comprises:
   identifying a subset of the one or more filters based on the input; and
   determining KPI contributions using a cluster of messages that satisfies the subset.

7. The method as claimed in claim 5 and further comprising:
   predicting different values of KPI for the message to be sent by applying KPI contributions specific to each cluster to the plurality of feature vectors; and recommending filters of a cluster for which value of KPI meets conditions specified by a marketer or for which value of the KPI is maximum.

8. The method as claimed in claim 1 and further comprising:
identifying words, in the message to be sent, that impact the predicted KPI value; and
indicating the identified words along with the impact.

9. The method as claimed in claim 8 and further comprising:
altering the message to be sent based on the impact of the identified words; and
predicting a KPI value for the altered message.

10. The method as claimed in claim 1 and further comprising:
tracking an actual KPI value for the message to be sent after the message is sent; and
using tracked KPI value as feedback to improve future predictions of KPI values.

11. A computer-implemented method for generating predictive insights for electronic messages, the method comprising:
tracking messages sent in past;
tracking values of key performance indicators (KPIs) for messages sent in past;
clustering messages based on one or more filters associated with the messages;
for each cluster, determining a predictive model for predicting KPI value using the messages in the cluster and tracked KPI values;
receiving a message to be sent as an input;
identifying a subset of the one or more filters from the input, wherein the subset is associated with the message to be sent;
selecting a predictive model from the determined predictive models using the subset of the one or more filters from the input;
predicting a KPI value for the message to be sent by applying the selected predictive model on the message to be sent;
identifying words, in the message to be sent, that impact the predicted KPI value; and
indicating the identified words along with the impact.

12. The method as claimed in claim 11, wherein determining the predictive model for each cluster comprises:
generating feature vectors of the messages in the cluster; and
for each feature vector, determining a KPI contribution using the tracked KPI values of the messages in the cluster and the feature vectors of the messages in the cluster, wherein the KPI contribution is a measure of contribution of a feature vector to KPI value.

13. The method as claimed in claim 12, wherein predicting the KPI value of the message to be sent comprises:
generating a plurality of feature vectors of the message to be sent; and
applying the KPI contributions determined using the tracked KPI values of the messages in the cluster and the feature vectors of the messages in the cluster to the plurality of feature vectors of the message to be sent, wherein the plurality of feature vectors of the message to be sent is a subset of feature vectors of the messages in the cluster.

14. The method as claimed in claim 12 and further comprising:
identifying words, in the message to be sent, which correspond to feature vectors that positively or negatively impact the KPI value, wherein the impact of a feature vector is determined based on corresponding KPI contribution; and
indicating the identified words along with the impact.

15. The method as claimed in claim 14 and further comprising:
altering the message to be sent based on the impact of the identified words; and
predicting KPI value for the altered message.

16. The method as claimed in claim 11 and further comprising:
tracking actual KPI value for the message to be sent after the message is sent; and
using tracked KPI value as feedback to improve the selected predictive model to improve future predictions of KPI value.

17. An apparatus for generating predictive insights for messages, the apparatus comprising:
a memory; and
one or more processors electronically coupled to the memory, the one or more processors, in conjunction with the memory, cause the apparatus to:
receive a message to be sent as an input,
access feature vectors for messages sent in past, and observed key performance indicator (KPI) values for the messages sent in past,
based on an analysis of the feature vectors and the observed KPI values for the messages sent in the past, determine KPI contributions, wherein the KPI contributions comprise a measure of contribution of a feature vector to a KPI
predict a KPI value for the message to be sent by applying the determined KPI contributions to the feature vectors of the message to be sent; and
present the predicted KPI value and the message to be sent.

18. The apparatus as claimed in claim 17, wherein determining the KPI contributions comprises:
identifying one or more filters associated with the messages sent in the past;
clustering messages sent in the past based on the one or more filters, wherein the messages in a given cluster have common filters; and
for each cluster, determining KPI contributions of feature vectors of messages in that cluster.

19. The apparatus as claimed in claim 18, wherein predicting the KPI value of the message to be sent comprises:
generating a plurality of feature vectors of the message to be sent; and
applying the KPI contributions, determined using the tracked KPI values of the messages sent in the past that satisfy the one or more filters and the feature vectors of the messages sent the in past that satisfy the one or more filters, to the plurality of feature vectors of the message to be sent, wherein the plurality of feature vectors of the message to be sent is a subset of feature vectors of the messages sent in the past that satisfy the one or more filters.

20. The apparatus as claimed in claim 18 wherein the one or more processors, in conjunction with the memory, cause the apparatus to:

identify words, in the message to be sent, which correspond to feature vectors that positively or negatively impact the KPI value, wherein the impact of a feature vector is determined based on a corresponding KPI contribution; and indicate the identified words along with the impact.

\* \* \* \* \*